United States Patent
Nohmi

(10) Patent No.: US 11,914,021 B2
(45) Date of Patent: Feb. 27, 2024

(54) VELOCITY MEASUREMENT DEVICE, VELOCITY MEASUREMENT PROGRAM, RECORDING MEDIUM, AND VELOCITY MEASUREMENT METHOD

(71) Applicant: ALOUETTE TECHNOLOGY INC., Mitaka (JP)

(72) Inventor: Hitoshi Nohmi, Mitaka (JP)

(73) Assignee: ALOUETTE TECHNOLOGY INC., Tokyo (JP)

( * ) Notice: Subject to any disclaimer, the term of this patent is extended or adjusted under 35 U.S.C. 154(b) by 786 days.

(21) Appl. No.: 16/979,322

(22) PCT Filed: Mar. 30, 2018

(86) PCT No.: PCT/JP2018/013781
§ 371 (c)(1),
(2) Date: Sep. 9, 2020

(87) PCT Pub. No.: WO2019/187056
PCT Pub. Date: Oct. 3, 2019

(65) Prior Publication Data
US 2021/0003692 A1    Jan. 7, 2021

(51) Int. Cl.
*G01S 13/58* (2006.01)
*G01S 7/40* (2006.01)

(52) U.S. Cl.
CPC .......... *G01S 13/58* (2013.01); *G01S 7/4026* (2013.01); *G01S 7/4056* (2013.01); *G01S 7/403* (2021.05)

(58) Field of Classification Search
CPC ...... G01S 13/58; G01S 13/581; G01S 13/582; G01S 13/931; G01S 13/585; G01S 13/34;
(Continued)

(56) References Cited

U.S. PATENT DOCUMENTS 6,924,762 B2    8/2005  Miyake et al.
9,057,785 B1 *  6/2015  Lee .......................... G01S 13/95
(Continued)

FOREIGN PATENT DOCUMENTS

DE    10 2012 203 172 A1    9/2012
EP           0 730 166 A1    9/1996
(Continued)

OTHER PUBLICATIONS

Notification of Transmittal of Translation of the International Preliminary Report on Patentabililty (Form PCT/IB/338) issued in counterpart International Application No. PCT/JP2018/013781 dated Oct. 15, 2020 with Forms PCT/IB/373, PCT/ISA/237 and, PCT/IB/326 (17 pages).
(Continued)

*Primary Examiner* — Peter M Bythrow
(74) *Attorney, Agent, or Firm* — WHDA, LLP

(57) ABSTRACT

An object is to enable measurement of position and velocity of a measurement object.

A velocity measurement device includes a transmitting means, a receiving means, and a signal processing means. The transmitting means transmits a transmission signal by a transmitting antenna toward a measurement object. The receiving means receives a reflected wave from the measurement object with multiple receiving antennas and generates a reception signal for each of the receiving antennas. The signal processing means obtains a phase plane of the reflected wave with respect to an antenna plane of the multiple receiving antennas from a phase difference between the reception signals to specify an arrival direction of the reflected wave, obtains a distance to the measurement object from a propagation delay time of the reflected wave, and
(Continued)

calculates a phase fluctuation of the reflected wave to calculate a velocity of the measurement object from the phase fluctuation.

12 Claims, 15 Drawing Sheets

(58) Field of Classification Search
CPC .... G01S 13/343; G01S 13/583; G01S 13/584; G01S 7/403; G01S 7/4026; G01S 7/4056
See application file for complete search history.

(56) References Cited

U.S. PATENT DOCUMENTS

| | | | |
|---|---|---|---|
| 9,689,983 B2* | 6/2017 | Cao | G01S 13/42 |
| 2005/0156780 A1* | 7/2005 | Bonthron | G01S 3/48 |
| | | | 342/134 |
| 2006/0220949 A1* | 10/2006 | Nohmi | G01S 13/343 |
| | | | 342/107 |
| 2006/0262007 A1* | 11/2006 | Bonthron | G01S 13/44 |
| | | | 342/107 |
| 2009/0224960 A1* | 9/2009 | Ishii | G01S 13/345 |
| | | | 342/104 |
| 2015/0061922 A1* | 3/2015 | Kishigami | G01S 13/48 |
| | | | 342/147 |
| 2015/0097713 A1* | 4/2015 | Nakai | G01S 13/06 |
| | | | 342/27 |
| 2015/0198697 A1* | 7/2015 | Kishigami | G01S 7/2923 |
| | | | 342/145 |
| 2016/0161609 A1 | 6/2016 | Tanaka et al. | |
| 2017/0082744 A1* | 3/2017 | Matsumoto | G01S 7/352 |
| 2017/0123059 A1* | 5/2017 | Asanuma | G01S 13/343 |
| 2017/0131385 A1* | 5/2017 | Kurono | G01S 7/352 |
| 2017/0299427 A1 | 10/2017 | Nohmi | |
| 2018/0252809 A1* | 9/2018 | Davis | G01S 13/32 |
| 2020/0103517 A1* | 4/2020 | Kim | G01S 13/931 |
| 2020/0393536 A1* | 12/2020 | Stettiner | G01S 13/343 |
| 2021/0156982 A1* | 5/2021 | Stettiner | G01S 13/931 |
| 2022/0214440 A1* | 7/2022 | Sahara | G01S 13/343 |

FOREIGN PATENT DOCUMENTS

| | | |
|---|---|---|
| EP | 1718179 A2 | 11/2006 |
| EP | 3 184 974 A1 | 6/2017 |
| JP | 4-270981 A | 9/1992 |
| JP | 2007-327814 A | 12/2007 |
| JP | 2012-185039 A | 9/2012 |
| JP | 2014-163753 A | 9/2014 |
| JP | 2016-109675 A | 6/2016 |
| JP | 2017-90143 A | 5/2017 |
| WO | 2005/069905 A2 | 8/2005 |
| WO | 2007/014333 A2 | 2/2007 |
| WO | 2016/027296 A1 | 2/2016 |
| WO | 2016/027422 A1 | 2/2016 |

OTHER PUBLICATIONS

International Search Report dated Jun. 26, 2018, issued in counterpart International Application No. PCT/JP2018/013781, with English Translation. (6 pages).
Written Opinion of the International Searching Authority (Form PCT/ISA/237) dated Jun. 26, 2018, issued in counterpart International Application No. PCT/JP2018/013781. (5 pages).
Extended (Supplementary) European Search Report dated Oct. 11, 2021, issued in counterpart EP Application No. 18911989.4. (8 pages).
Office Action dated Jul. 15, 2022, issued in counterpart EP application No. 18911989.4. (7 pages).
Office Action dated Mar. 8, 2022, issued in counterpart JP Application No. 2020-508829, with English Translation. (8 pages).
Office Action dated Feb. 1, 2023, issued in counterpart EP application No. 18911989.4. (8 pages).

* cited by examiner

VELOCITY MEASUREMENT DEVICE, VELOCITY MEASUREMENT PROGRAM, RECORDING MEDIUM, AND VELOCITY MEASUREMENT METHOD

TECHNICAL FIELD

The present disclosure relates to a technique for measuring a velocity of a measurement object such as a vehicle.

BACKGROUND ART

A microwave radar is generally used as a method for measuring a velocity of a measurement object such as a vehicle. Radar systems of microwave radars are classified into an FSK (Frequency shift Keying) radar system, an FMCW (Frequency Modulated Continuous Wave) radar system, (e.g., Patent Literature 1), a Fast Ramp system, etc.

The FSK radar system alternately transmits CW (Continuous Wave) signals of two frequencies. With each of the CW signals reflected by a measurement object and received by a receiving unit, a transmission signal of the CW signal is mixed as a local signal to obtain a beat signal. These beat signals are Fourier-transformed to obtain information on a distance to the object and a velocity.

A velocity measurement method of a general FMCW radar system includes transmitting a linear FMCW signal alternately repeating a rise and a fall in frequency at a constant slope. The frequency of this linear FMCW signal has a triangular shape in a graph in which a horizontal axis represents time and a vertical axis represents frequency. The signal reflected by the measurement object is converted into an intermediate frequency by a frequency mixer (mixer) using the transmission signal as a local signal. This intermediate frequency is a function of the distance and the velocity of the measurement object, and by analyzing the intermediate frequency of a reflected wave from a specific measurement object at the time of transmission during rising and falling, the velocity and position of the object can be measured.

The Fast Ramp system is developed based on the FMCW radar system. In the FMCW radar system, the position and the velocity are obtained from reception signals at the time of two types of transmission, i.e., during rising and falling. The Fast Ramp system transmits a linear FMCW signal having a constant frequency slope in a very wide band. The frequency bandwidth of the signal used in the Fast Ramp system is, for example, 4 GHz since the velocity is obtained from a change in position. The Fast Ramp system uses a wideband transmission signal such as a millimeter wave to obtain a position of a measurement object with high frequency and high accuracy and can calculate the velocity of the measurement object from a change in the position.

CITATION LIST

Patent Literature

Patent Literature 1: U.S. Pat. No. 6,924,762

SUMMARY OF INVENTION

Technical Problem

These radar systems have the following problems.

The FSK radar system can measure the position and velocity of the measurement object when the measurement object exists alone in a measurement region. However, when multiple measurement objects exist in an observation range of a radar, such as when a following vehicle approaching a preceding vehicle exists, or when multiple vehicles are running side by side in multiple lanes, reflected signals cause interference. Therefore, the FSK radar system cannot measure the correct position and velocity when multiple measurement objects exist in the measurement region.

In the FMCW radar system, an intermediate frequency of a reception signal reflected by a measurement object depends on a slope of a transmission frequency and the position and velocity of the measurement object. Additionally, if multiple measurement objects exist at different distances within the measurement range, a pairing process is required for determining a combination of a reception signals at the time of a rising slope and a reception signals at the time of a falling slope in terms of the frequency of the transmission signal so as to calculate the positions and velocities of the multiple measurement objects. This causes a problem that when multiple measurement objects exist and further cause overlap of noises, the pairing process is extremely difficult. Therefore, the FMCW radar system has a problem that signal generation and processing become complicated due to combining signals having various different characteristics etc. Additionally, when multiple measurement objects exist at the same distance and at the same velocity within the measurement range, the FMCW radar system cannot separate the multiple measurement objects. Therefore, the FMCW radar system has a problem that vehicles running side by side in multiple lanes cannot be identified.

The Fast Ramp system identifies multiple vehicles and calculates a velocity from position displacement. Transmission of a wideband signal is required to obtain a high position resolution, which causes a problem that the system can use only a millimeter wave frequency band in which such a wideband signal is permitted. Furthermore, as with the FMCW radar system, the Fast Ramp system has a problem that vehicles running side by side in multiple lanes cannot be identified.

Therefore, in view of the problems, an object of a technique of the present disclosure is to enable measurement of position and velocity of a measurement object without the need for a complicated process such as a pairing process, without the need for a wideband signal that can be used only in a millimeter wave frequency band, and even when multiple measurement objects exist in a measurement region.

Solution to Problem

A first aspect of the present disclosure provides a velocity measurement device including a transmitting means, a receiving means, and a signal processing means. The transmitting means transmits a transmission signal by a transmitting antenna toward a measurement object. The receiving means receives a reflected wave from the measurement object with multiple receiving antennas and generates a reception signal for each of the receiving antennas. The signal processing means obtains a phase plane of the reflected wave with respect to an antenna plane of the multiple receiving antennas from a phase difference between the reception signals to specify an arrival direction of the reflected wave, obtains a distance to the measurement object from a propagation delay time of the reflected wave, and calculates a phase fluctuation of the reflected wave to calculate a velocity of the measurement object from the phase fluctuation.

The velocity measurement device may further include a display means that displays an image representing the position and the velocity of the measurement object in accordance with the arrival direction of the reflected wave, the distance to the measurement object, and the velocity of the measurement object.

The velocity measurement device may further include a signal generating means that generates a reference signal for synchronizing the transmission signal of the transmitting means, the reception signal of the receiving means, and a signal process of the signal processing means.

The transmitting means may output a pulse signal, or a pulse signal chirp-modulated for pulse compression, for detecting the measurement object or a distance to the measurement object. The receiving means may perform the pulse compression of the reception signal in phase synchronization with a reference signal and separate the measurement object by the distance.

The transmitting means may output an FMCW signal for detecting the measurement object or a distance to the measurement object. The transmitting means may branch a portion of the transmission signal to generate a local signal, and the receiving means may generate an intermediate frequency signal by using the local signal, analyze the intermediate frequency signal in phase synchronization with a reference signal, and separate each measurement object by the distance.

The multiple receiving antennas may be arranged one-dimensionally. The receiving means or the signal processing means may specify an azimuth of the measurement object from a phase difference of the reception signal.

A second aspect of the present disclosure provides a velocity measurement program for causing a computer to measure a velocity of a measurement object. The velocity measurement program causes the computer to transmit a transmission signal by a transmitting antenna toward a measurement object, to obtain, from a phase difference between reception signals generated from a reflected wave from the measurement object received with multiple receiving antennas, a phase plane of the reflected wave with respect to an antenna plane of the multiple receiving antennas to specify an arrival direction of the reflected wave, to obtain a distance to the measurement object from a propagation delay time of the reflected wave, and to calculate a phase fluctuation of the reflected wave to calculate a velocity of the measurement object from the phase fluctuation.

The computer may further display an image representing the position and the velocity of the measurement object in accordance with the arrival direction of the reflected wave, the distance to the measurement object, and the velocity of the measurement object.

A third aspect of the present disclosure provides a computer-readable recording medium recording the velocity measurement program.

A fourth aspect of the present disclosure provides a velocity measurement method. This velocity measurement method includes: transmitting a transmission signal by a transmitting antenna toward a measurement object; receiving a reflected wave from the measurement object with multiple receiving antennas and generating a reception signal for each of the receiving antennas; and obtaining a phase plane of the reflected wave with respect to an antenna plane of the multiple receiving antennas from a phase difference between the reception signals to specify an arrival direction of the reflected wave, obtaining a distance to the measurement object from a propagation delay time of the reflected wave, and calculating a phase fluctuation of the reflected wave to calculate a velocity of the measurement object from the phase fluctuation.

The velocity measurement method may further include displaying an image representing the position and the velocity of the measurement object in accordance with the arrival direction of the reflected wave, the distance to the measurement object, and the velocity of the measurement object.

Advantageous Effects of Invention

According to the technique of the present disclosure, at least one of the following effects is obtained.

(1) Since the reflected wave is received with the multiple receiving antennas and the reception signal is generated for each of the receiving antennas, the azimuth of the measurement object and the distance to the measurement object can be specified, and the position of the measurement object can be specified. A pairing process essential for extracting the velocity and the position by a conventional FMCW radar system is not required, and a velocity measurement process is easy even when multiple measurement objects exist in a measurement region of a radar. By using a signal in a band narrower than a wideband transmission signal used in the Fast Ramp system, the measurement objects can individually be identified, and the velocities can individually be measured. Even in a frequency band other than millimeter waves, the velocity measurement can be implemented within the regulations of the Radio Law.

(2) Since the position of the measurement object can be specified, the velocities of the multiple measurement objects can respectively be measured. For example, multiple vehicles, i.e., the multiple measurement objects, running side by side on a road having multiple lanes such as an expressway can be identified, and the velocity of each of the measurement objects can be measured.

(3) Since the velocity of the measurement object is calculated from the phase fluctuation of the reflected wave, the velocity of the measurement object can be obtained in a short measurement period. A required time Tp for the measurement defined as the measurement period is a reciprocal of a frequency accuracy ΔFd of the Doppler frequency corresponding to the accuracy of the measurement velocity. When the velocity measurement accuracy is ΔV and the wavelength of the transmission wave is λ, the required time Tp can be represented by Eq. (1) and is a short time as described in description of embodiments.

[Formula 1]

$$Tp = \frac{1}{\Delta Fd} = \frac{\lambda}{2 \cdot \Delta V} \qquad (1)$$

Other objects, features, and advantages of the present invention will become more apparent by reference to the accompanying drawings, embodiments, etc.

Figure 10:
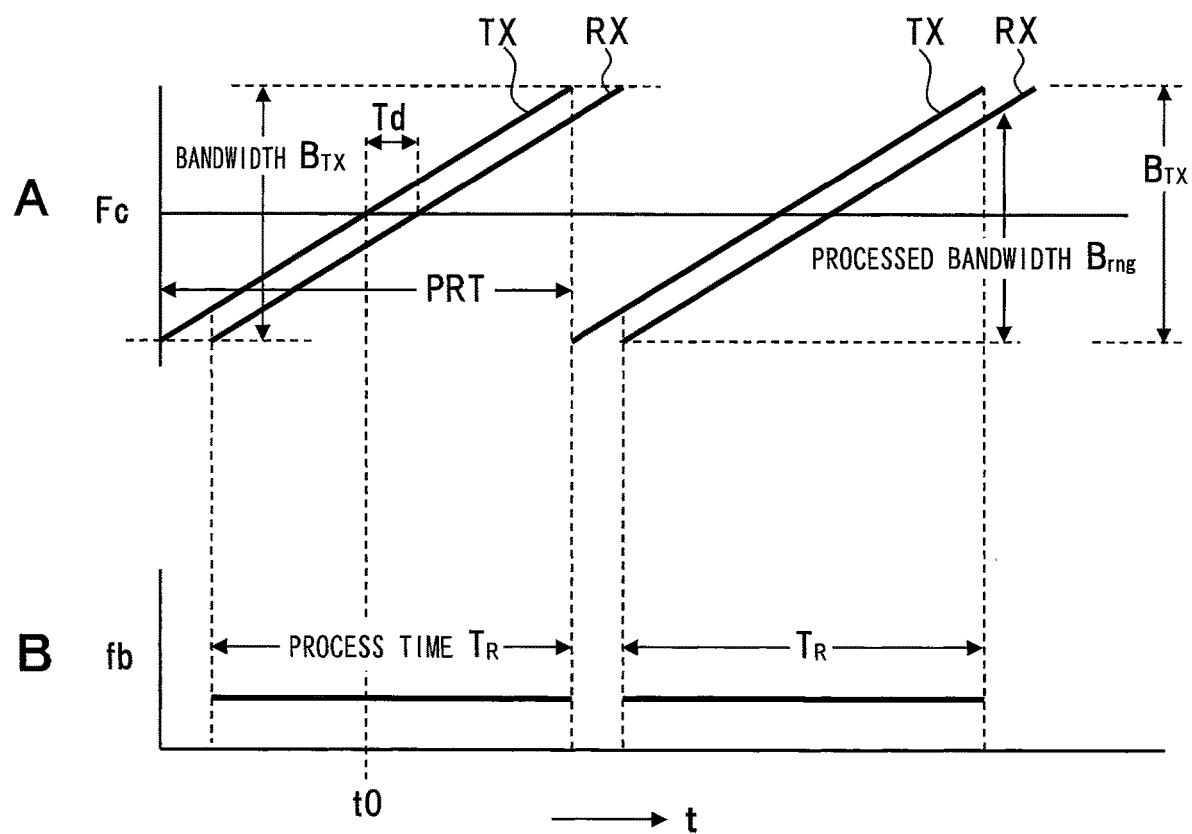

A of FIG. 10 is a diagram showing an example of frequency changes of a transmission signal and a reception signal, and B of FIG. 10 is a diagram showing an example of a frequency of an output signal output from a MIXER.

Figure 11:
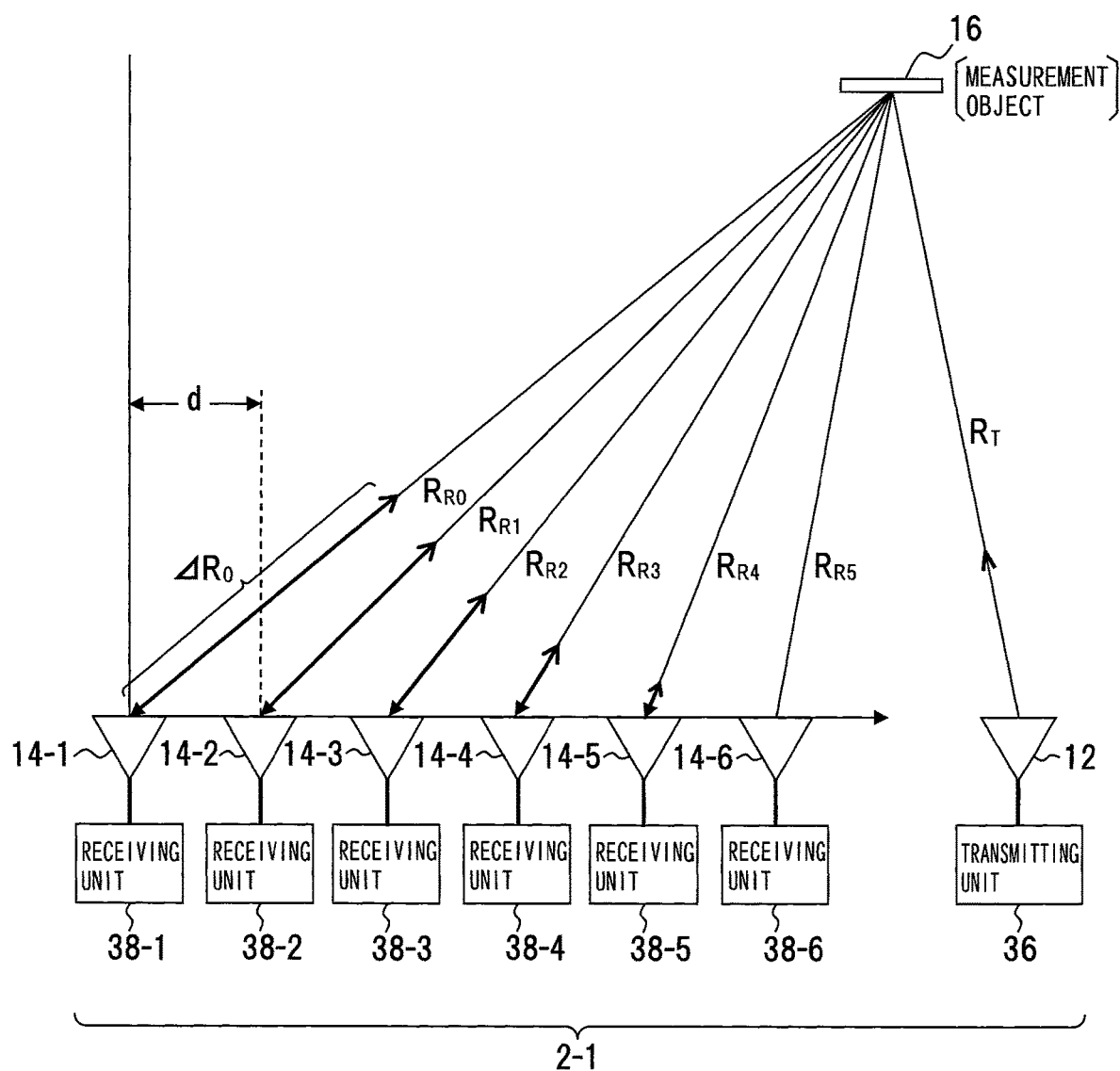

FIG. 11 is a diagram showing an example of a reception state of a reception wave.

Figure 12:
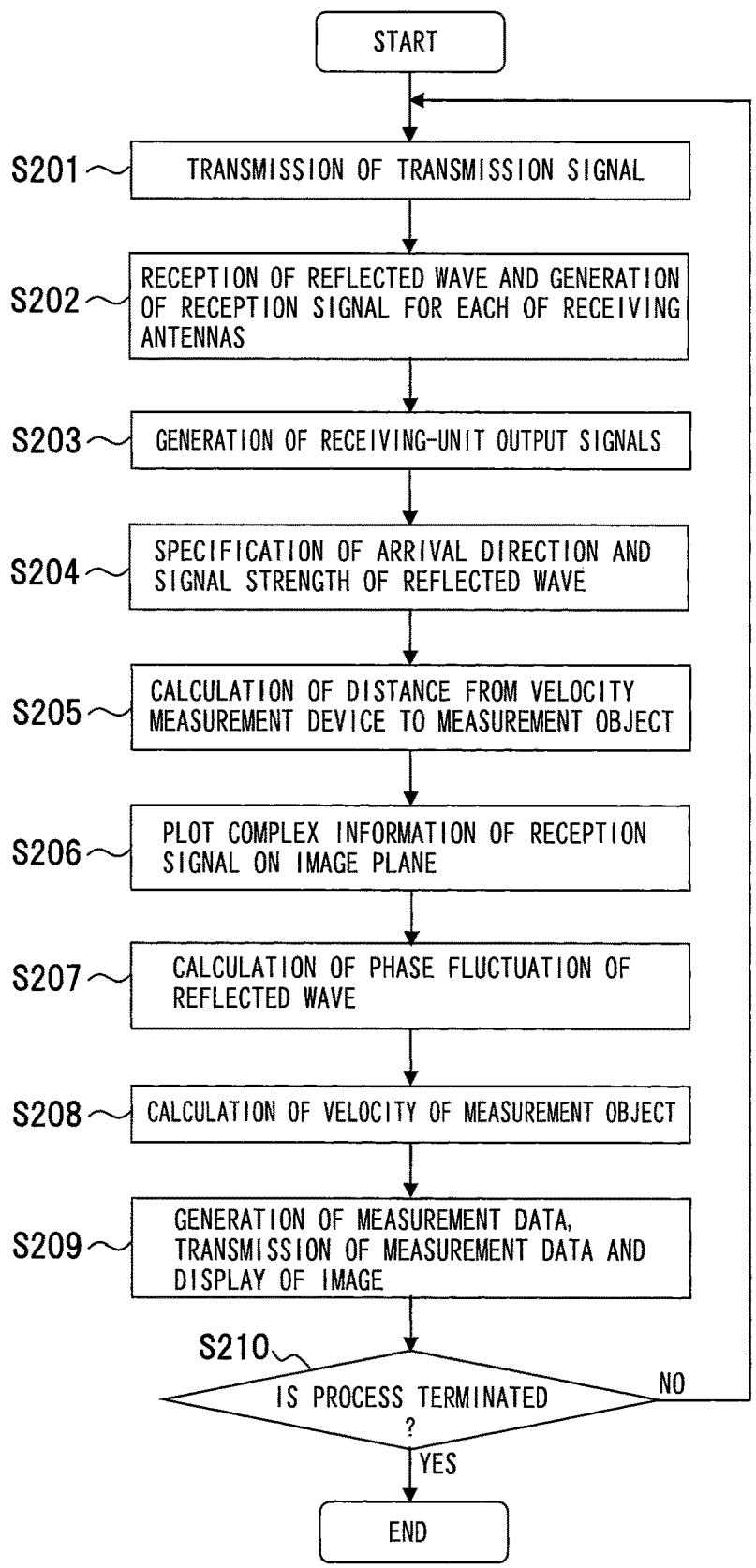

FIG. 12 is a flowchart showing an example of a process procedure of velocity measurement and image generation for a measurement object.

Figure 13:
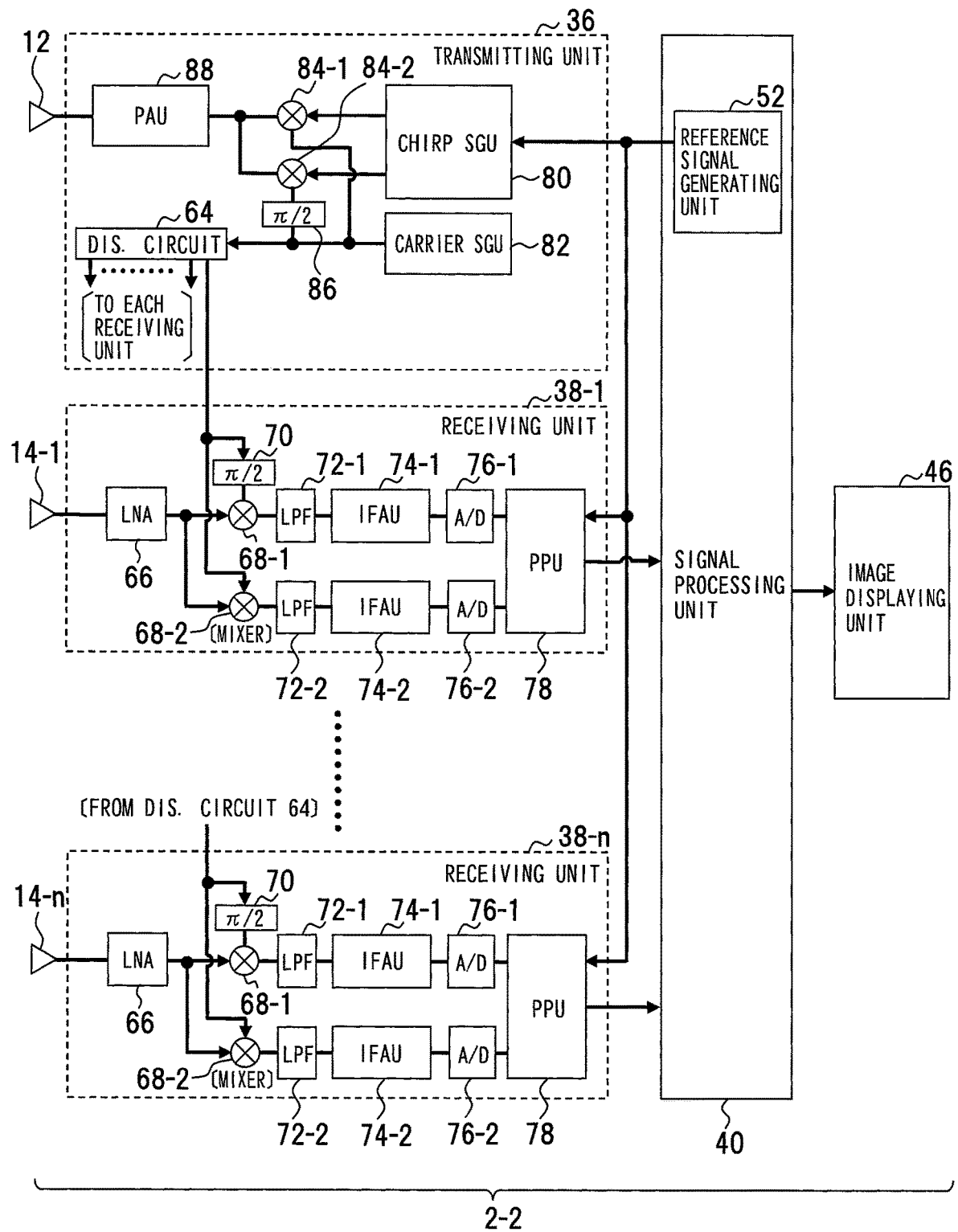

FIG. 13 is a diagram showing an example of a velocity measurement device of a pulse signal system.

Figure 14:
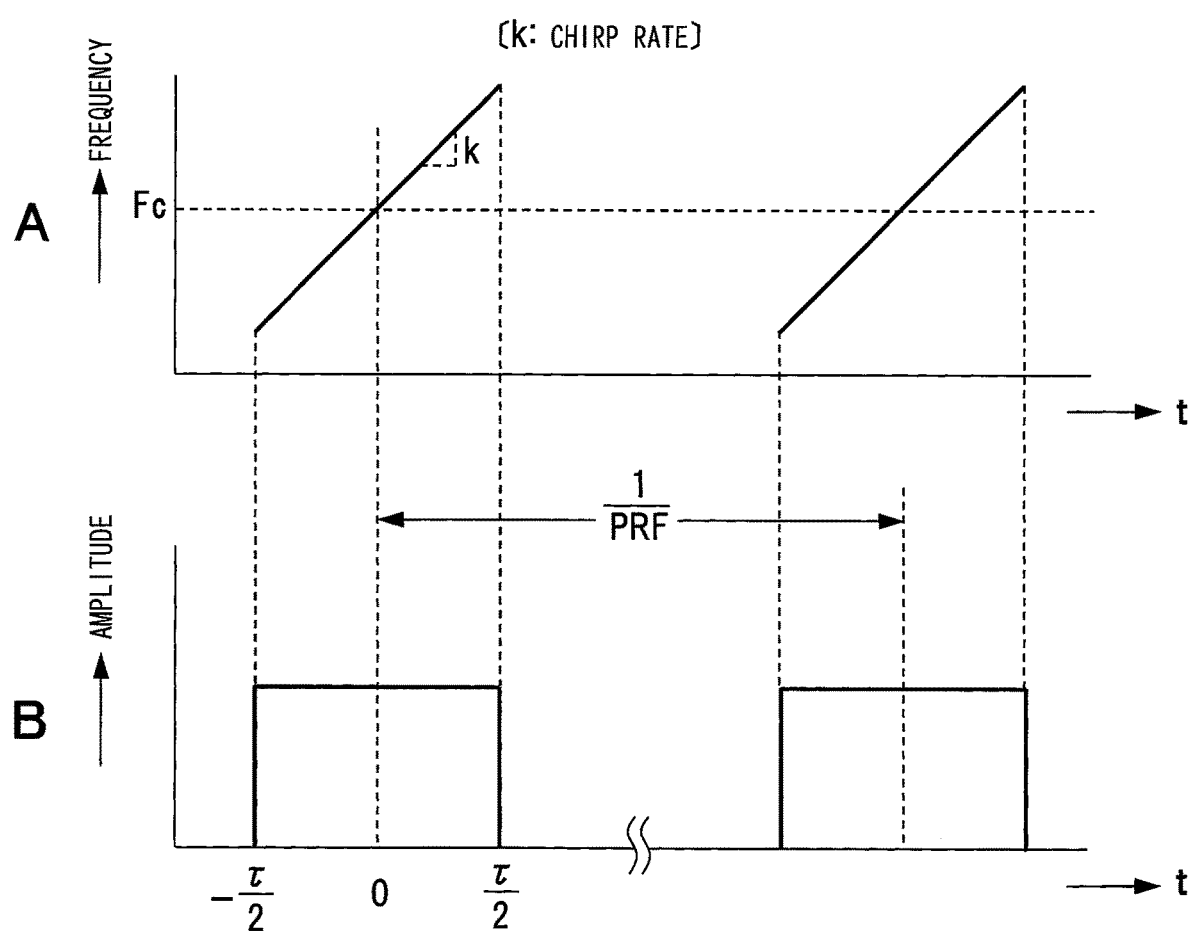

A of FIG. 14 is a diagram showing an example of a frequency change of the transmission signal, and B of FIG. 14 is a diagram showing an example of an amplitude change of the transmission signal.

Figure 15:
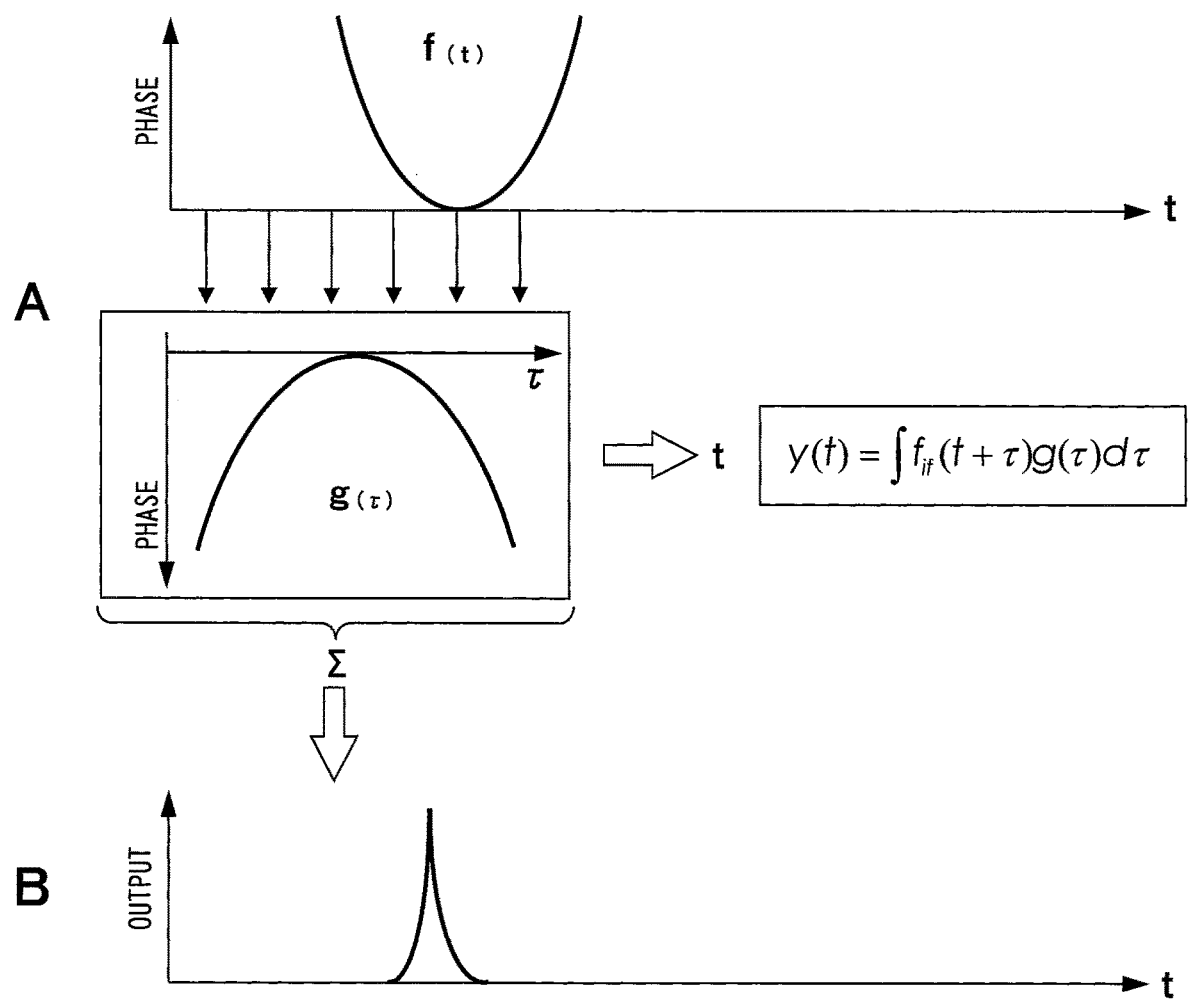

A of FIG. 15 and B of FIG. 15 are diagrams showing an example of a pulse compression process of a preprocessing unit.

DESCRIPTION OF EMBODIMENTS

Embodiments and examples will now be described with reference to the drawings.

Embodiments

Figure 1:
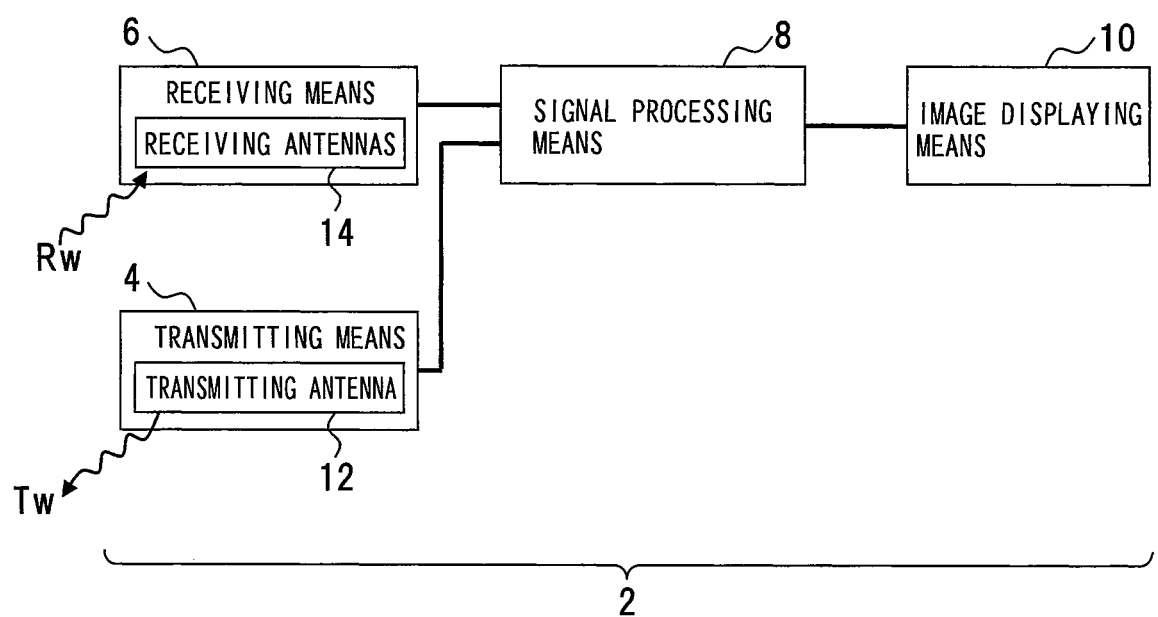
FIG. 1 is a diagram showing an example of a velocity measurement device according to an embodiment.
Figure 2:
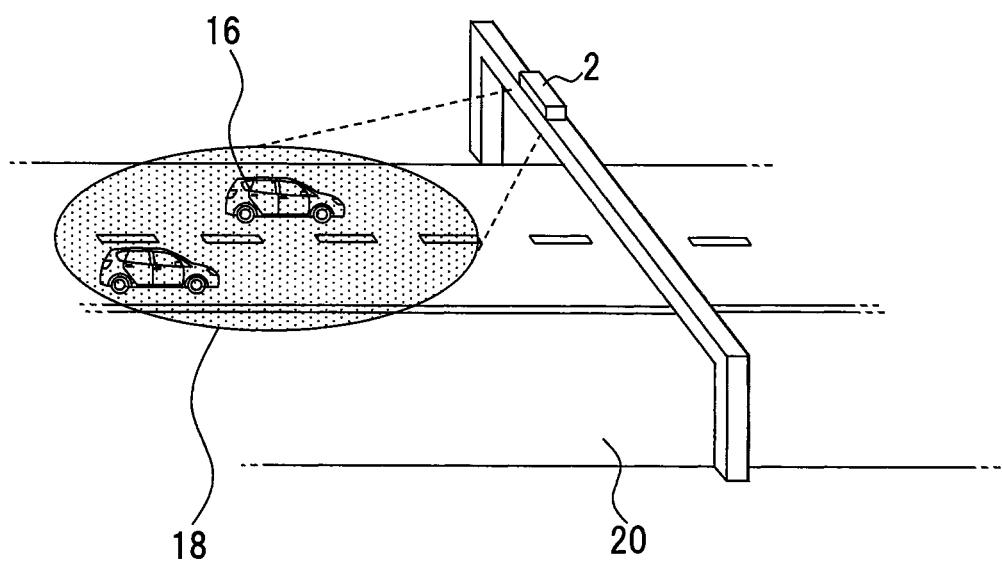
FIG. 2 is a diagram showing an example of measurement by the velocity measurement device.

FIG. 1 shows an example of a velocity measurement device according to an embodiment. FIG. 2 shows an example of measurement by the velocity measurement device.

The velocity measurement device 2 includes a transmitting means 4, a receiving means 6, a signal processing means 8, and an image displaying means 10. The velocity measurement device 2 measures an azimuth of a measurement object 16 (FIG. 2) such as a running vehicle, a distance from the velocity measurement device 2 to the measurement object 16 (hereinafter referred to as a "distance of the measurement object 16"), and a velocity of the measurement object 16.

The transmitting means 4 is a transmitter, for example, and includes at least one transmitting antenna 12. The transmitting means 4 transmits a transmission wave Tw serving as a transmission signal toward a measurement region 18 (FIG. 2). The directivity of the transmission wave Tw is suppressed so that the transmission wave Tw reaches the entire measurement region 18. The transmission wave Tw is a pulse wave or an FMCW signal wave, for example. A repetition frequency thereof is a frequency sufficiently higher than a Doppler frequency generated by the velocity of the measurement object 16. With these transmission waves Tw, the phase fluctuation of the measurement object can be made sufficiently small and ignorable within one period of repetition of the pulse wave or the FMCW signal wave; the reflection point of the transmission wave Tw, i.e., the distance to the measurement object 16, can easily be specified by a range compression process; and the measurement object 16 can be identified in accordance with the azimuth and distance of the measurement object 16.

The receiving means 6 is, for example, a receiver, includes multiple receiving antennas 14, receives a reflected wave Rw from the measurement object 16, and generates a reception signal for each of the receiving antennas 14. The receiving antennas 14 are arranged on a straight line, i.e., one-dimensionally, and form an antenna plane.

The signal processing means 8 is, for example, a processing device, generates a transmission signal, and processes the reception signal generated by the receiving means 6 to generate measurement data including azimuth information, distance information, and velocity information of the measurement object 16 and signal strength information of the reflected wave Rw. The signal processing means 8 obtains a phase plane of the reflected wave Rw with respect to the antenna plane of the receiving antennas 14 from a phase difference between the reception signals generated for the respective receiving antennas 14 and specifies an arrival direction and a signal strength of the reflected wave Rw. The arrival direction of the reflected wave Rw represents the azimuth of the measurement object 16, and the azimuth information of the measurement object 16 and the signal strength information of the reflected wave Rw can be obtained by specifying the arrival direction and the signal strength. The signal processing means 8 obtains the distance of the measurement object 16 from a propagation delay time of the reflected wave Rw. The propagation delay time of the reflected wave Rw is the time required from the transmission of the transmission wave Tw to the reception of the reflected wave Rw. The signal processing means 8 also calculates a phase fluctuation of the reflected wave Rw from the measurement object 16 during a constant measurement period including multiple repetition periods to calculate the velocity of the measurement object 16.

The image displaying means 10 is an image display device such as a display, for example, and includes an image displaying unit displaying an image. The image displaying means 10 generates an image from the measurement data obtained by the signal processing means 8 and displays the image.

As shown in FIG. 2, the velocity measurement device 2 is disposed above a road 20, for example, and measures a velocity of each vehicle running in the measurement region 18 on the road 20 in front of the vehicle. The vehicle is an example of the measurement object. The velocity measurement device 2 may be disposed on a shoulder of the road 20 or a median strip of the road 20, for example.

Figure 3:
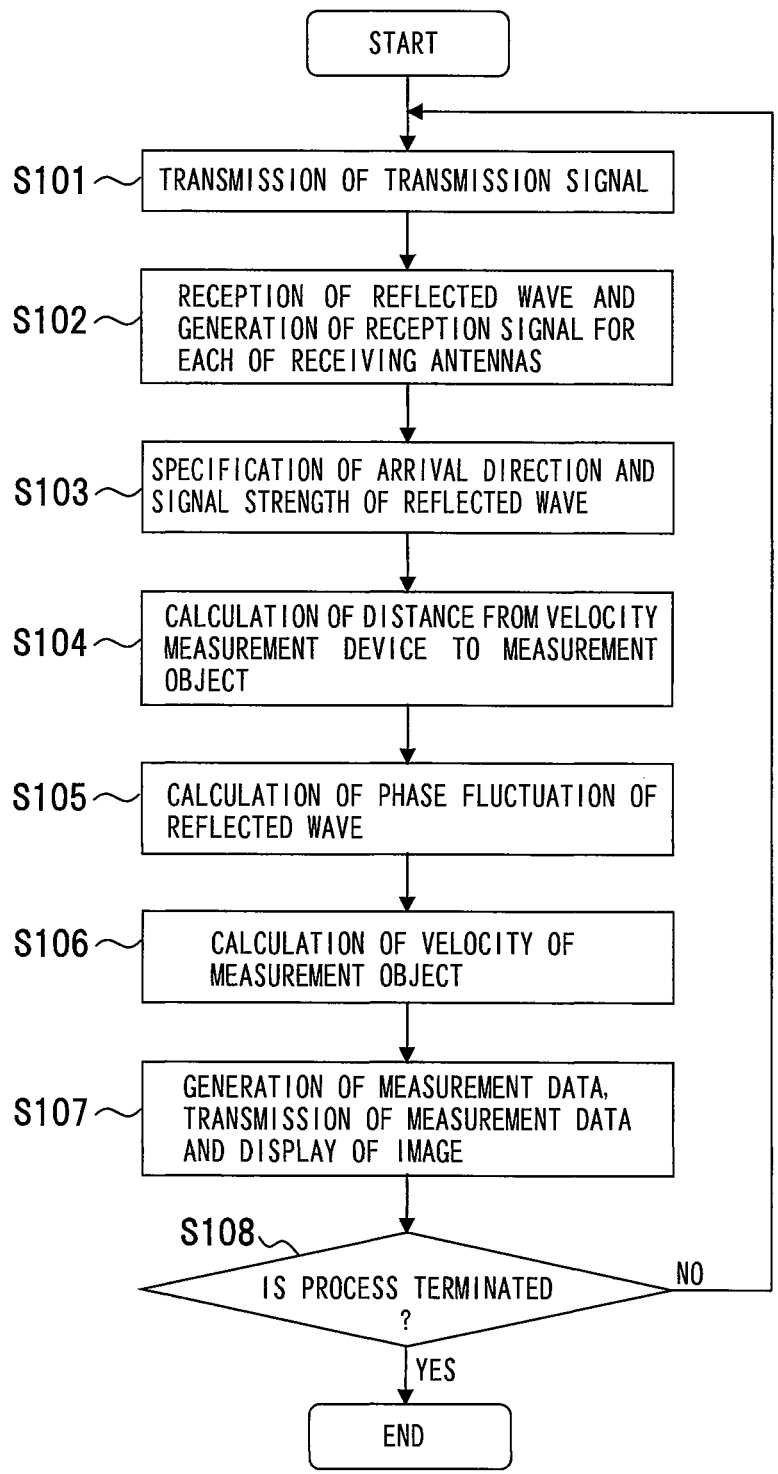
FIG. 3 is a flowchart showing an example of a process procedure of velocity measurement and image generation for a measurement object.

FIG. 3 shows an example of a process procedure of velocity measurement and image generation for a measurement object. This process procedure is an example of a velocity measurement method. In this process procedure, a process performed by the signal processing means 8 is processed by the signal processing means 8 executing an example of a velocity measurement program.

This process procedure includes position specification, velocity measurement, and image display for the measurement object 16 by the signal processing means 8. In this process procedure, after the measurement is started, the signal processing means 8 transmits a transmission signal toward the measurement region 18 by using the transmitting means 4 (S101). This transmission signal has a repetition frequency sufficiently higher than the Doppler frequency determined from the velocity of the measurement object 16 and is continuously transmitted for a measurement period determined from a required measurement accuracy $\Delta V$ for the velocity, i.e., for a required time Tp. This transmission signal also goes to the measurement object 16 in the measurement region 18 and is reflected by the measurement object 16 in the measurement region 18 and a non-measurement object such as the road 20 and a building, i.e., a stationary object that is not the object of velocity measurement. The receiving means 6 receives the reflected wave Rw from the measurement object 16 and the non-measurement object and generates a reception signal for each of the receiving antennas 14 (S102).

The signal processing means 8 calculates the phase plane of the reflected wave Rw with respect to the antenna plane of the receiving antennas 14 and specifies the arrival direction and the signal strength of the reflected wave Rw (S103). The signal processing means 8 calculates the distance of the measurement object 16 from the propagation delay time of the reflected wave Rw (S104). The signal processing means 8 may calculate a distance from the velocity measurement device 2 to the non-measurement object (hereinafter referred to as "distance of the non-measurement object"). By specifying the arrival direction at S103 and specifying the distance at S104, at least a position of the measurement object 16 reflecting the transmission signal is specified. The signal processing means 8 calculates a phase fluctuation of the reflected wave Rw during the measurement period for each arrival direction and each distance (S105) and calculates the velocity of the measurement object 16 (S106). The signal processing means 8 may or may not calculate the velocity of the non-measurement object. Therefore, the signal processing means 8 may determine that an object remaining still at the velocity of 0 is a non-measurement object and may omit the calculation of the velocity of the non-measurement object.

The signal processing means 8 generates the measurement data described above, transmits the measurement data to the image displaying means 10, and causes the image displaying means 10 to display an image (S107). The signal processing means 8 determines whether the process is terminated (S108) and, if the process is not terminated (NO at S108), the signal processing means 8 returns to the transmission of the transmission signal (S101). Therefore, if the process is not terminated (NO at S108), the process from S101 to S108 is repeated. If the process is terminated (YES at S108), the signal processing means 8 terminates this process.

Figure 4:
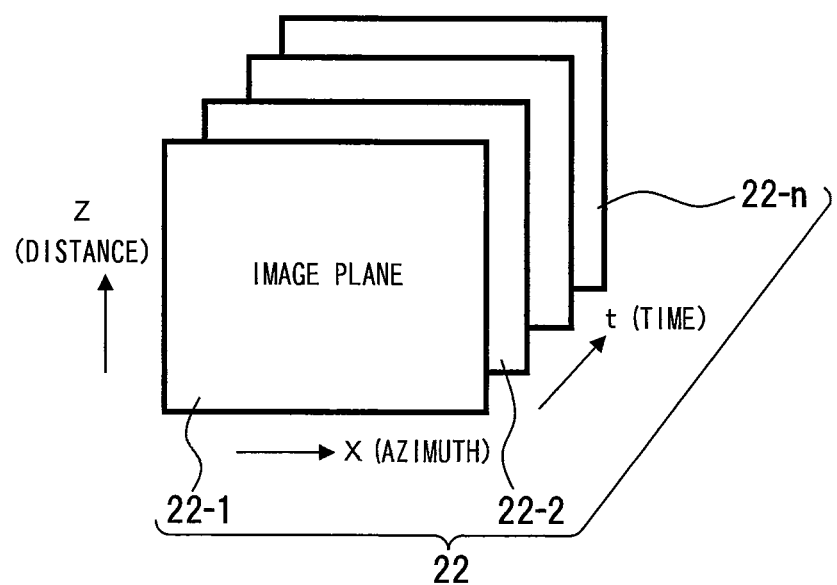
FIG. 4 is a diagram showing an example of a three-dimensional image data structure.

FIG. 4 shows an example of a three-dimensional image data structure of the signal processing means 8. The measurement data of the three-dimensional image data structure has a vertical axis (z), a horizontal axis (x), and a depth; as shown in FIG. 4, the vertical axis (z) represents the distance of the measurement object 16, for example; the horizontal axis (x) represents the azimuth of the measurement object 16, for example; the depth is a time axis (t), for example; and the measurement data obtained at each radar repetition period is mapped. On the time axis, multiple image planes 22-1, 22-2, ... 22-n are formed for the required time Tp capable of achieving the required measurement accuracy ΔV for velocity. Complex information of the reflected wave Rw from the measurement object 16 specified by the distance and the azimuth and the reception signal is plotted on each of the image planes 22-1, 22-2, ... 22-n. This complex information includes phase information of the reception signal representing the phase of the reflected wave Rw from the measurement object 16 (hereinafter referred to as "phase information of the measurement object 16"). A distance of movement of the measurement object 16 during the measurement period (required time Tp) required for achieving the required measurement accuracy ΔV for velocity is usually extremely small as compared to a range spatial resolution. Therefore, the positions of the measurement object 16 indicated in the image planes 22-1, 22-2, ... 22-n are the same, and only the phase changes.

When the velocity measurement device 2 is disposed and fixed on a sufficiently stable stand, the velocity information of the measurement object 16 is calculated from the phase information of the measurement object 16 as follows, for example.

It is assumed that φ(t) denotes a phase of a signal at a position (x, z) of a moving point P of the measurement object 16 at time t in the measurement region 18 such as the road 20. When the displacement of the moving point P due to the velocity is ΔR(t), the wavelength of the transmission wave Tw is λ, and the distance from the velocity measurement device 2 to the moving point P is R, the phase φ(t) of the signal at the moving point P is represented by Eq. (2) below.

[Formula 2]

$$\phi(t) = 2\pi \cdot \frac{2(R + \Delta R(t))}{\lambda} \tag{2}$$

Since the radar repetition frequency is sufficiently higher than the Doppler frequency generated at the velocity of the measurement object 16, the position ΔR(t) of the measurement object 16 during the repetition period can be considered as a fixed position. When times of respective repetition periods are t1, t2, ... tn, the phases φ(t1) ... φ(tn) of the signal at the times are represented by Eq. (3) below.

[Formula 3]

$$\phi(t1) = 2\pi \frac{2(R + \Delta R(t1))}{\lambda}$$
$$\vdots$$
$$\phi(tn) = 2\pi \frac{2(R + \Delta R(tn))}{\lambda} \tag{3}$$

The image planes 22-1, 22-2, ... 22-n show phase information at times t1, t2, ... to due to the Doppler effect of respective measurement objects 16 specified by the distance and azimuth, and therefore, by analyzing the data of the image planes 22-1, 22-2, ... 22-n of a certain time in the time direction, a change in the phase y(t), i.e., the Doppler frequency, of each of the measurement objects 16 can be obtained. Therefore, the phase information of each of the measurement objects 16 shown in the image planes 22-1, 22-2, ... 22-n can be subjected to fast Fourier transform (FFT) in the time direction to obtain a frequency spectrum of the reflected wave Rw. In the fast Fourier transform, the multiple image planes 22-1, 22-2, ... 22-n obtained during a data acquisition period Tp identical to the required time Tp are transformed. The data acquisition period Tp is an acquisition period of data in each fast Fourier transform and is a period between 22.5 milliseconds and 50 milliseconds, for example.

Figure 5:
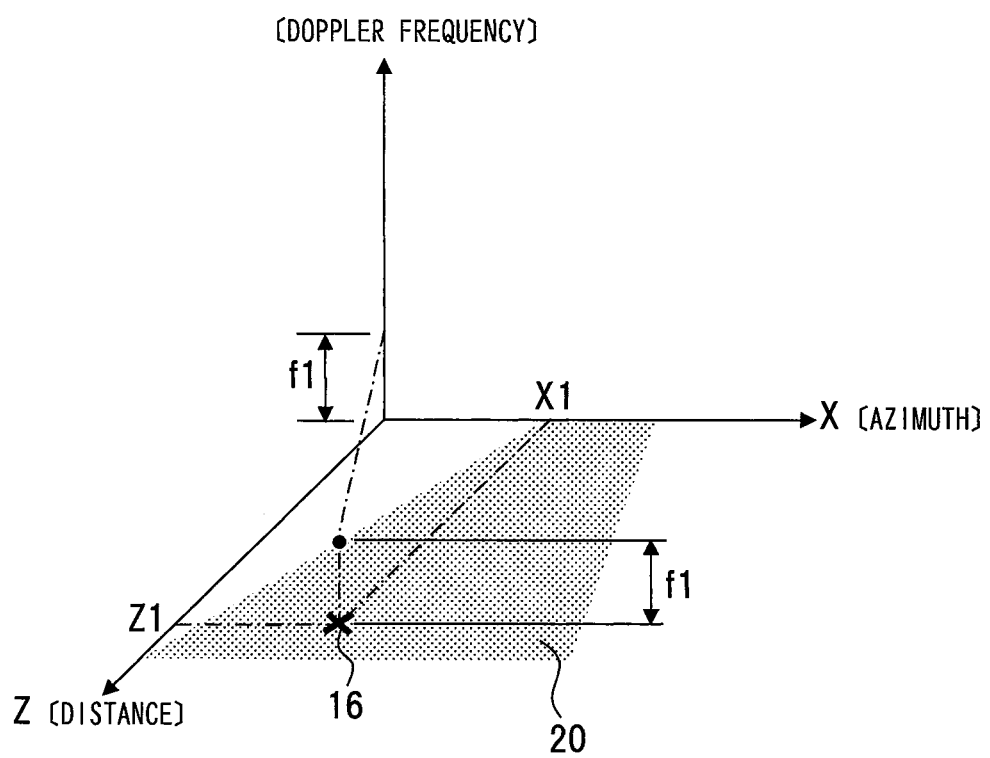
FIG. 5 is a diagram showing an example of a Doppler frequency of a measurement object at a position (X1, Z1).

FIG. 5 shows an example of the Doppler frequency of the measurement object at a position (X1, Z1). A mark "x" of FIG. 5 represents the position of the measurement object 16, and the hatching of FIG. 5 indicates the road 20. FIG. 5 shows that the Doppler frequency of the measurement object 16 at the position (X1, Z1) is f1. When the multiple measurement objects 16 exist in the measurement region 18, the velocity measurement device 2 specifies a position of each of the measurement objects 16 and calculates the Doppler frequency of each of the measurement objects 16 together with the position information.

The Doppler frequency of the reflected wave Rw from the stationary object is 0 hertz. When the measurement object 16 approaches the velocity measurement device 2, the Doppler frequency has a positive value, and the Doppler frequency increases as the approaching velocity of the measurement object 16 increases. When the measurement object 16 moves away from the velocity measurement device 2, the Doppler frequency has a negative value, and the Doppler frequency increases negatively as the moving velocity of the measurement object 16 increases. Therefore, the velocity of each of the measurement objects 16 can be calculated from the obtained Doppler frequency.

Since the reflected waves Rw from all the stationary objects have the Doppler frequency of 0 hertz, the stationary objects can easily be distinguished from the measurement object 16 and excluded from objects of velocity measurement.

Figure 6:
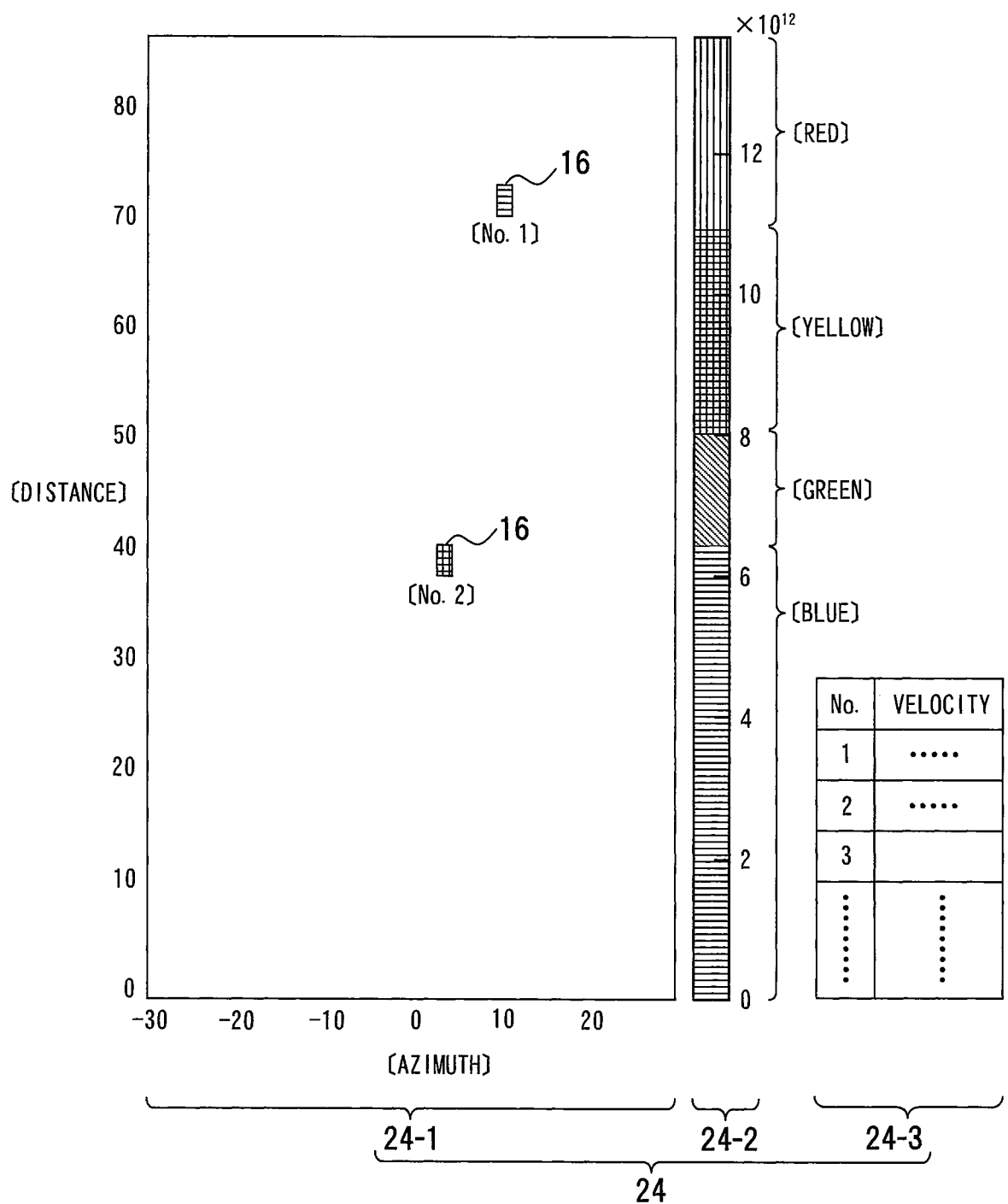
FIG. 6 is a diagram showing an example of an image displayed on an image displaying means.

FIG. 6 shows an example of an image displayed on the image displaying means. FIG. 6 is an example in which velocities of vehicles on the road 20 are measured. In FIG. 6, the hatchings of the measurement objects 16 and a signal strength index 24-2 represent colors. For each color, for example, the signal strength may be subdivided in accordance with a difference in color tone. In FIG. 6, the difference in color tone is not shown. In a monitoring screen 24-1 of FIG. 6, signal strength display of an object other than the measurement objects 16, i.e., an object outside a measurement object velocity range, is erased and processed to have the same blue color as the minimum strength. However, in the monitoring screen 24-1 of FIG. 6, the display of the color of the signal strength display of the object other than the measurement objects 16, i.e., the display of the blue, is omitted. By displaying the signal strength of the reflected wave Rw in the measurement region 18 by color on the monitoring screen 24-1, the monitoring screen 24-1 displays the measurement objects 16 and other objects. Since the monitoring screen 24-1 continuously displays the signal strength of the reflected wave Rw, the display positions of the measurement objects 16 move as time elapses.

An image 24 includes the monitor screen 24-1, the signal strength index 24-2, and a velocity display field 24-3. The image 24 displays the azimuth, distance, and velocity of the measurement objects 16 and the signal strength of the reflected wave Rw based on the measurement data output from the signal processing means 8.

The monitoring screen 24-1 has a screen having a horizontal axis representing an azimuth and a vertical axis representing a distance and displays the signal strength of the reflected wave Rw with the measurement region 18 in color in the monitoring screen 24-1, for example. The display of the signal strength of the reflected wave Rw represents the measurement object 16 as a difference in color, for example. The monitoring screen 24-1 displays the measurement object 16 in accordance with the azimuth and the distance in which the measurement object 16 exists. In the monitoring screen 24-1, the measurement object 16 is numbered under the control of the signal processing means 8.

The signal strength index 24-2 represents the signal strength by color, for example. The color corresponding to the signal strength index 24-2 is added to the monitor screen 24-1.

The velocity display field 24-3 includes a number display field and a velocity display field and displays the velocity of each of the measurement objects 16. The azimuth and distance of the measurement object 16 can also be displayed.

From the display of the image 24, the azimuth, distance, and velocity of each of the measurement objects 16 and the signal strength of the reflected wave Rw can visually be recognized, and these pieces of information on the measurement object 16 can easily be recognized.

According to this embodiment, for example, the following effects can be obtained.

(1) Since the multiple receiving antennas 14 are included, the azimuths and distances of the measurement objects 16 can be specified. The position and velocity of each of the measurement objects 16 can be measured by using the reception signals obtained from the reflected waves Rw from the multiple measurement objects 16. For example, multiple vehicles, i.e., the multiple measurement objects 16, running side by side on the road 20 having multiple lanes such as an expressway can be identified, and the velocity of each of the measurement objects 16 can be measured.

(2) Since the transmission signal from the transmitting antenna 12 is applied to the entire measurement region 18, a radiation beam scanning process is not required.

(3) The reflected waves Rw from the multiple measurement objects 16 can be received by the multiple receiving antennas 14. The directions and distances of the measurement objects 16 can be determined by analyzing the phase and the propagation delay time between the reception signals obtained by the respective receiving antennas 14.

(4) Since the velocity measurement device 2 includes the multiple receiving antennas 14 and uses, for example, the pulse wave or the FMCW signal wave as the transmission wave Tw, the azimuth and distance of each of the measurement objects 16 can be specified with high accuracy. The velocity measurement device 2 can generate an image for individually displaying the multiple measurement objects 16.

(5) The velocity calculated from a temporal change in the phase of the individual measurement object 16 can be imaged at regular time intervals. As a result, the velocity measurement and the position measurement can be performed with high accuracy.

(6) No pairing process is required, so that the velocity measurement process is easy.

(7) The Fast Ramp system requires a wideband signal varying over 4 GHz to achieve high position accuracy. However, the velocity measurement device 2 can use, for example, a band signal at such a level that vehicles can be separated (e.g., about 200 [MHz]). Therefore, the velocity measurement device 2 can be implemented within the regulations of the Radio Law.

(8) The positions and velocities of the measurement objects 16 can be measured by using multiple reception signals obtained from the multiple measurement objects 16 scattered on a two-dimensional surface. Therefore, the positions and velocities of multiple vehicles running side by side on the road 20 having multiple lanes can quickly and accurately be measured.

(9) If the transmission signal is a pulse wave or an FMCW signal wave, the measurement object 16 can be identified in accordance with the distance to the reflection point of the transmission wave Tw, i.e., the distance of the measurement object 16, by the range compression process. The arrival direction of the reflected wave Rw can be specified from the phase between the receiving antennas 14, and the measurement object 16 can be identified in accordance with the azimuth of the measurement object 16. The azimuth, distance, and velocity of each of the measurement objects 16 and the signal strength of the reflected wave Rw can be imaged. Furthermore, the velocities of the measurement objects 16 can be calculated from phase fluctuations of the reflected waves Rw from the measurement objects 16.

(10) Since the transmission wave Tw applied to the entire measurement region 18 reaches the entire measurement region 18, it is not necessary to spatially scan with the transmission signal from the transmitting antenna 12. Therefore, the reception signals can be acquired from all the measurement objects 16 at the radar repetition frequency higher than the Doppler frequency generated by the velocities of the measurement objects 16. The reception signals generated by the receiving antennas 14 are then subjected to a digital beam forming process to analyze a phase history for each repetition period of the measurement object 16 so as to obtain the velocity. The image 24 can be obtained with high resolution, and the velocity measurement result can be imaged at regular time intervals. As a result, the velocity measurement can be performed with high accuracy.

[Modification]

Figure 7:
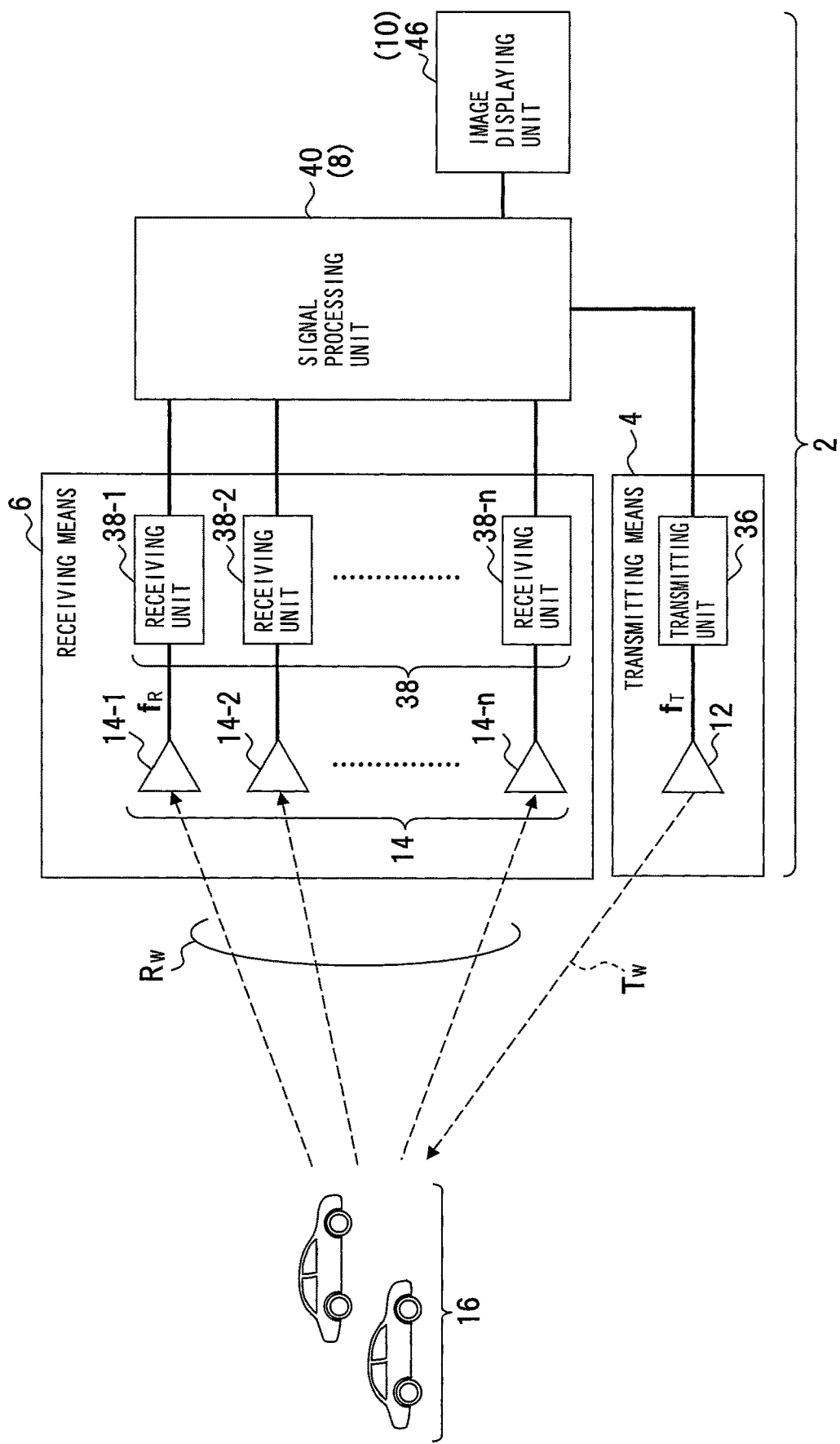
FIG. 7 is a diagram showing an example of a velocity measurement device according to a modification.

The velocity measurement device 2 of the embodiment may be modified as shown in FIG. 7, for example. For example, the transmitting means 4 may include a transmitting unit 36 and the receiving means 6 may include a receiving unit group 38. The signal processing means 8 may be a signal processing unit 40, and the image displaying means 10 may be an image displaying unit 46. In FIG. 7, the same portions as those of FIG. 1 are denoted by the same reference signs.

The transmitting unit 36 is connected to the single transmitting antenna 12, for example, and outputs a transmission signal $f_T$ to this transmitting antenna 12. The transmission wave Tw is the transmission signal $f_T$ and is transmitted from the transmitting antenna 12 toward the measurement objects 16. This transmission wave Tw is a microwave, for example. Any one of a pulse signal, an FMCW signal, etc. is used as the transmission signal $f_T$. In a system using the pulse signal (hereinafter referred to as "pulse signal system") and a system using the FMCW signal (hereinafter referred to as "FMCW signal system"), the measurement object 16 can be identified in accordance with the azimuth of the measurement object 16 and the distance of the measurement object 16.

The receiving unit group 38 includes multiple receiving units 38-1, 38-2, . . . 38-$n$. The multiple receiving units 38-1, 38-2, . . . 38-$n$ are respectively connected to receiving antennas 14-1, 14-2, . . . 14-$n$. The reflected wave Rw from the measurement object 16 is received by the receiving antennas 14-1, 14-2, . . . 14-$n$, and a reception signal $f_R$ is generated for each of the receiving antennas 14-1, 14-2, . . . 14-$n$. For example, the receiving antennas 14-1, 14-2, . . . 14-$n$ are arranged parallel to a surface of the road 20 and one-dimensionally to form an antenna plane.

The reception signal $f_R$ is processed by signal processes such as amplification, phase conversion, and digital conversion in the receiving units 38-1, 38-2, . . . 38-$n$ in accordance with the signal system of the transmission signal $f_T$. The reception signals $f_R$ processed by the receiving units 38-1, 38-2, . . . 38-$n$ are output as receiving-unit output signals from the receiving units 38-1, 38-2, . . . 38-$n$ to the signal processing unit 40.

The signal processing unit 40 is an example of the signal processing means 8. The signal processing unit 40 obtains the phase plane of the reflected wave Rw with respect to the antenna plane from the phase difference between the reception signals $f_R$ by using the reception signals $f_R$ output from the receiving units 38-1, 38-2, . . . 38-$n$ and specifies the arrival direction and the signal strength of the reflected wave Rw. The signal processing unit 40 also obtains the distance of the measurement object 16 from the propagation delay time of the reflected wave Rw. Additionally, the signal processing unit 40 calculates the phase fluctuation of the reflected wave Rw for each arrival direction of the reflected wave Rw and each distance of the measurement object 16 and calculates the velocity of the measurement object 16 from the phase fluctuation of the reflected wave Rw. The signal processing unit 40 generates and outputs the measurement data described above in the embodiment to the image displaying unit 46.

The image displaying unit 46 is an example of the image displaying means 10 and generates, for example, the image 24 from the measurement data and displays the image 24.

Figure 8:
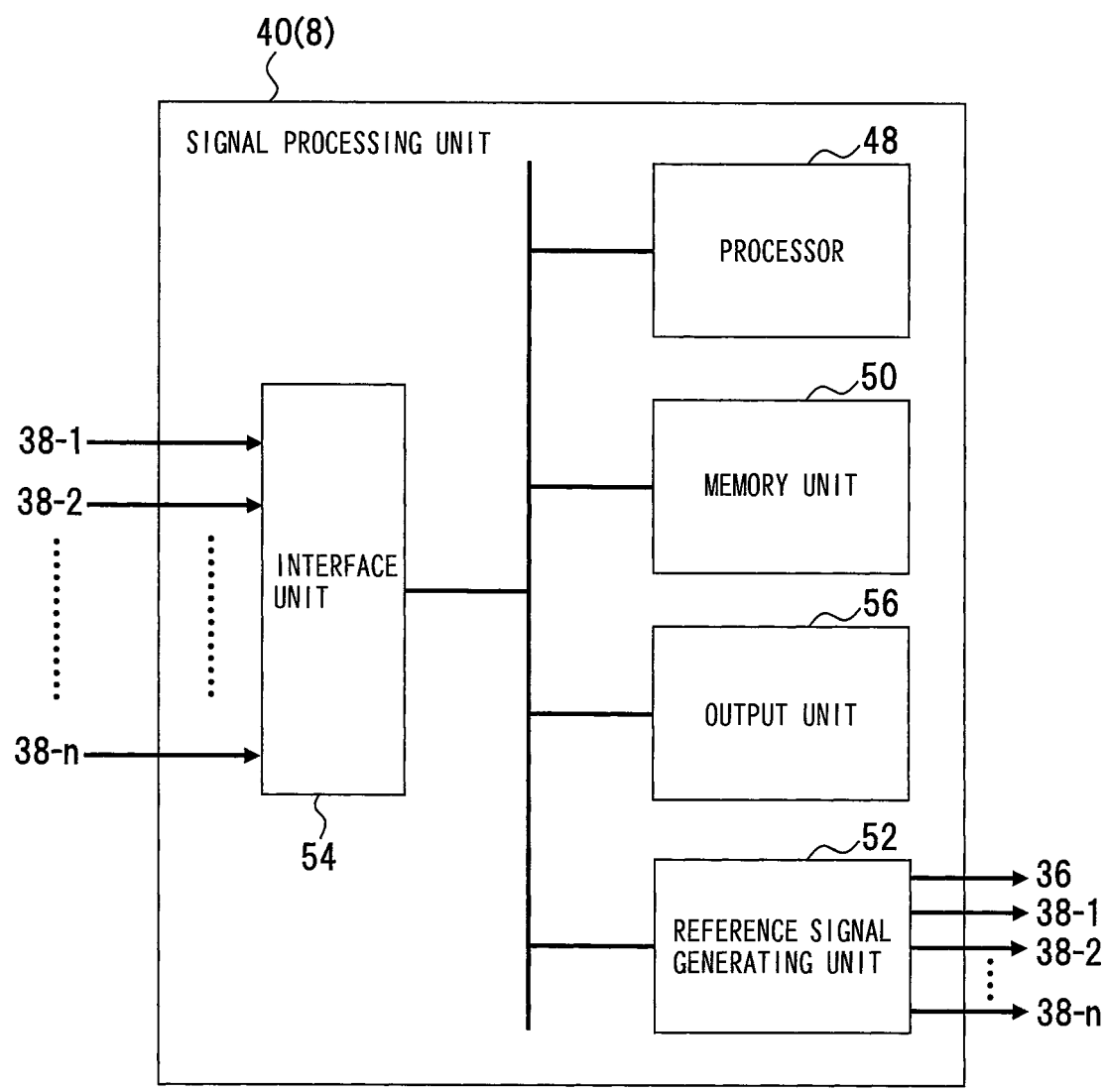
FIG. 8 is a diagram showing an example of a signal processing unit.

FIG. 8 shows an example of the signal processing unit.

The signal processing unit 40 is made up of a computer, for example, and includes a processor 48, a memory unit 50, a reference signal generating unit 52, an interface unit 54, and an output unit 56, for example.

The processor 48 includes an information processing unit that executes an OS (Operating System) and a velocity measurement program stored in the memory unit 50. The processor 48 performs signal processes necessary for velocity measurement, and controls various functional units.

The memory unit 50 is an example of a computer-readable recording medium and includes a RAM (Random Access Memory) and a ROM (Read Only Memory), for example. The RAM constitutes a work area for executing various programs. The ROM is an example of a means for recording a program, stores the OS and the velocity measurement program described above, and stores various data necessary for velocity measurement and measurement data obtained through velocity measurement. The ROM is a semiconductor memory such as an EEPROM (Electrically Erasable and Programmable Read Only Memory) or a flash memory in which contents can electrically be rewritten.

The memory unit 50 is not limited to the RAM or the ROM and may be a computer-readable recording medium such as a magnetic disk, a flexible disk, a hard disk, an optical disk, a magneto-optical disk, or an SSD (solid state drive).

The reference signal generating unit 52 is controlled by the processor 48 and generates a reference signal serving as a synchronization signal. This reference signal is provided to the transmitting unit 36 and the receiving units 38-1, 38-2, . . . 38-$n$.

The interface unit 54 takes in the reception signals $f_R$ output from the receiving units 38-1, 38-2, . . . 38-$n$. The output unit 56 outputs the measurement data obtained by executing the velocity measurement program.

The velocity measurement device 2 as described above can perform the process procedure of velocity measurement and image generation for a measurement object described in the embodiment and can provide the same effects as the embodiment.

Example 1

Figure 9:
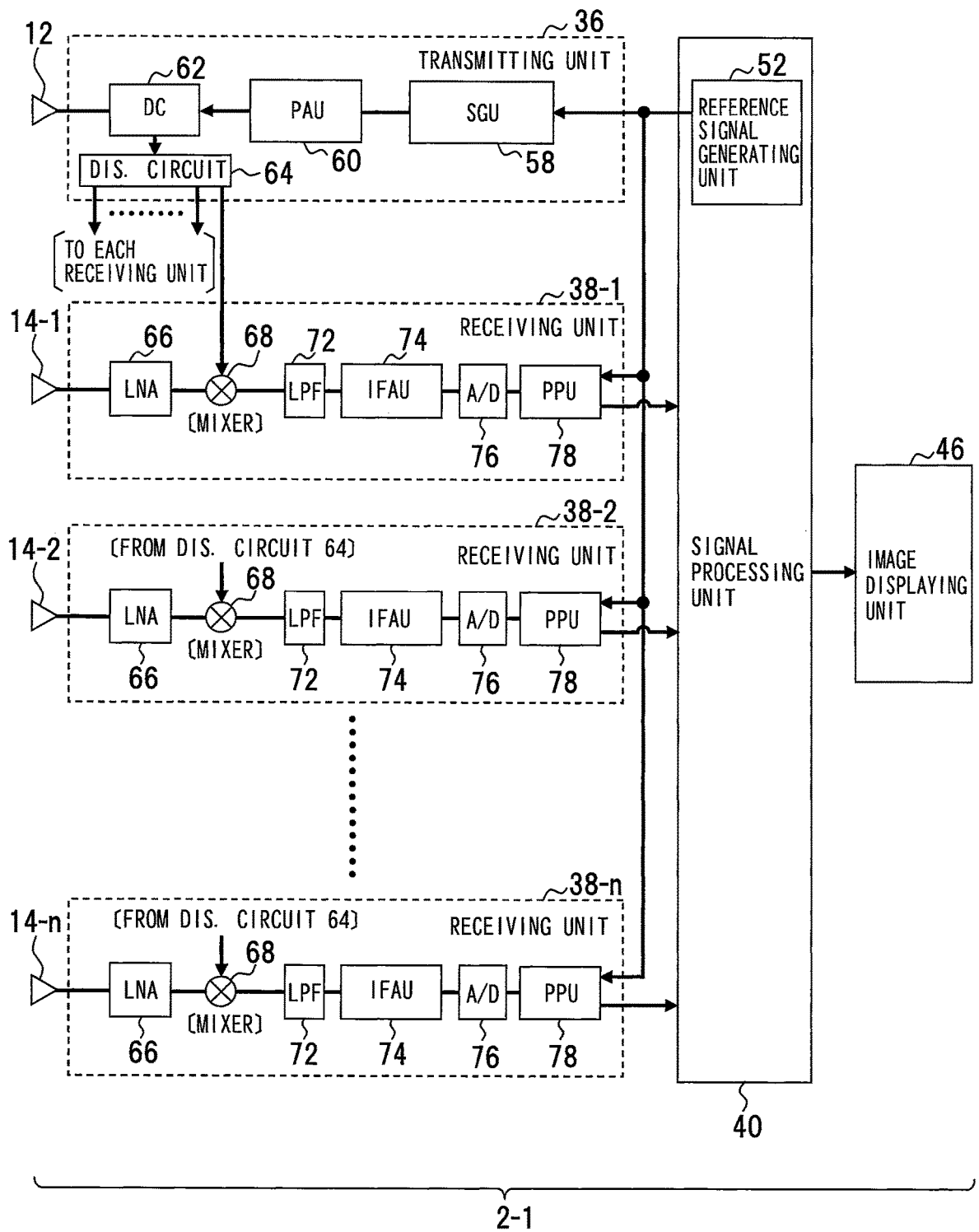
FIG. 9 is a diagram showing an example of a velocity measurement device of an FMCW signal system.

FIG. 9 shows a velocity measurement device 2-1 of an FMCW signal system. In FIG. 9, the same portions as those of FIG. 1, 7, or 8 are denoted by the same reference signs.

The velocity measurement device 2-1 includes the transmitting unit 36, the receiving units 38-1, 38-2, . . . 38-$n$, the signal processing unit 40, and the image displaying unit 46.

The transmitting unit 36, the receiving units 38-1, 38-2, . . . 38-n, and the image displaying unit 46 are connected through a local area network, for example. The velocity measurement device 2-1 uses the FMCW signal system to use the frequency of the transmission signal $f_T$ as a linear FM signal for scanning over a wide band as in the FMCW radar system, for example, thereby improving the range resolution.

The reference signal generating unit 52 of the signal processing unit 40 generates a reference signal with high frequency stability and supplies this reference signal to the transmitting unit 36 and the receiving units 38-1, 38-2, . . . 38-n.

The transmitting unit 36 includes a signal generating unit (SGU) 58, a power amplifying unit (PAU) 60, a directional coupler (DC) 62, and a distribution circuit (DIS. CIRCUIT) 64. The signal generating unit 58 generates an FMCW signal based on the reference signal provided from the reference signal generating unit 52 and supplies the FMCW signal to the power amplifying unit 60. The FMCW signal is an example of the transmission signal $f_T$, and the frequency of the FMCW signal is linearly modulated from a lower limit frequency to an upper limit frequency of a bandwidth $B_{TX}$ (A of FIG. 10) having a constant width. The power amplifying unit 60 amplifies the FMCW signal to a predetermined level and supplies the amplified FMCW signal to the directional coupler 62. The directional coupler 62 branches the FMCW signal into a first FMCW signal and a second FMCW signal, supplies the first FMCW signal to the transmitting antenna 12, and supplies the second FMCW signal via the distribution circuit 64 to each of the receiving units 38-1, 38-2, . . . 38-n. In the transmitting antenna 12, the transmission wave Tw serving as the transmission signal $f_T$ is generated from the first FMCW signal, and the transmission wave Tw is applied to the measurement region 18. The second FMCW signal is used as a local signal in the receiving units 38-1, 38-2, . . . 38-n.

The distribution circuit 64 distributes the second FMCW signal received from the directional coupler 62 to the receiving units 38-1, 38-2, . . . 38-n.

The transmission wave Tw applied to the measurement region 18 is reflected by the measurement object 16 or the non-measurement object in the measurement region 18, and the reflected wave Rw is generated. The receiving antennas 14-1, 14-2, . . . 14-n receive the reflected wave Rw to obtain the reception signals $f_R$. The reception signals $f_R$ are supplied to the receiving units 38-1, 38-2, . . . 38-n.

Each of the receiving units 38-1, 38-2, . . . 38-n includes a low noise amplifier (LNA) 66, a frequency mixer (MIXER) 68, a low pass filter (LPF) 72, an intermediate frequency amplifying unit (IFAU) 74, an analog/digital converter (hereinafter referred to as "A/D") 76, and a preprocessing unit (PPU) 78. The LNA 66 amplifies the supplied reception signal $f_R$ and supplies the amplified reception signal $f_R$ to the MIXER 68. The MIXER 68 mixes the second FMCW signal supplied from the transmitting unit 36 with the reception signal $f_R$ and converts the frequency of the reception signal $f_R$ to generate an intermediate frequency signal of the reception signal $f_R$. The MIXER 68 supplies the intermediate frequency signal to the LPF 72. The LPF 72 allows passage of a signal component, which has a low frequency, of the intermediate frequency signal and supplies a low-frequency component signal of the intermediate frequency signal to the intermediate frequency amplifying unit 74. Therefore, the LPF 72 extracts a low frequency component of the intermediate frequency signal. The intermediate frequency amplifying unit 74 amplifies the low-frequency component signal to a predetermined level and supplies the amplified low-frequency component signal to the A/D 76. The A/D 76 converts the low-frequency component signal into a digital signal and supplies the low-frequency component signal converted into the digital signal to the preprocessing unit 78. The intermediate frequency signal is the frequency-converted reception signal $f_R$, while the low-frequency component signal is the reception signal $f_R$ limited to the low frequency component, and both signals are examples of the reception signal $f_R$.

The preprocessing unit 78 converts the provided reception signal $f_R$, which is the digital signal, through the FFT process into a digital signal having a frequency domain corresponding to a range space. The FFT-processed reception signal $f_R$ is provided as a receiving-unit output signal to the signal processing unit 40.

In measurement in the FMCW signal system, the transmission signal $f_T$ is a continuous wave, and the transmission of the transmission signal $f_T$ and the reception of the reception signal $f_R$ are simultaneously performed. Since the transmission and the reception are simultaneously performed, measures must be taken to prevent the transmission signal $f_T$ from the transmitting antenna 12 from directly reaching the receiving antennas 14-1, 14-2, . . . 14-n. For example, a certain distance is set between the transmitting antenna 12 and the receiving antennas 14-1, 14-2, . . . 14-n, or an interference prevention shield is disposed between the transmitting antenna 12 and the receiving antenna 14-1, 14-2, . . . 14-n. In other words, an interval or a shield is set so as not to cause interference between the transmitting antenna 12 and the receiving antennas 14-1, 14-2, . . . 14-n.

FIG. 10 is a diagram for explaining the FMCW signal and shows states of the transmission signal and the reception signal. A of FIG. 10 shows frequency changes of the transmission signal and the reception signal, and B of FIG. 10 shows the frequency of the output signal (intermediate frequency signal) output from the MIXER. In A of FIG. 10, TX represents the frequency of the transmission signal $f_T$ input to the MIXER 68, and RX represents the frequency of the reception signal $f_R$ input to the MIXER 68. A value of a frequency fb of the output signal output from the MIXER 68 is the same as the frequency difference between the transmission signal $f_T$ and the reception signal $f_R$ at certain time point.

A certain time is required for a radio wave such as the transmission wave Tw and the reflected wave Rw to travel a distance (round-trip distance) twice the distance from the transmitting antenna 12 and the receiving antenna 14 to the measurement object 16. The arrival of the reception signal $f_R$ at the MIXER 68 is delayed by this certain time from the arrival of the transmission signal $f_T$ at the MIXER 68. This arrival delay of the reception signal $f_R$ (hereinafter referred to as "propagation delay") causes a frequency difference between the transmission signal $f_T$ and the reception signal $f_R$. This frequency difference is the frequency fb of the output signal of the MIXER 68. This certain time and the propagation delay are represented by a propagation delay time Td in A of FIG. 10 and cause a frequency difference between the frequency of the transmission signal $f_T$ and the frequency of the reception signal $f_R$ at each time point.

The distance from the transmitting antenna 12 to the measurement object 16 is denoted by $R_T$, the distance from the receiving antenna 14 to the measurement object 16 is denoted by $R_R$, and the velocity of the measurement object 16 is denoted by V. At time t0 when the frequency of the transmission signal $f_T$ becomes $F_0$ for the first time, the values of t and N are both 0. The value of N is incremented by 1 for each repetition period PRT of the FMCW signal, and the value of N is increased to 1, 2, 3, . . . n, where n is an integer. The value of the repetition period PRT is denoted by PRT, and the change rate (chirp rate) of the frequency of the transmission signal $f_T$ is denoted by k. A transmission signal $f_T(t)$ is represented by Eq. (4), and a reception signal $f_R(t)$ is represented by Eq. (5).

[Formula 4]

$$f_T(t) = \cos 2\pi\left(\frac{k}{2}t^2 + F_C t\right) \quad (4)$$

$$-\frac{PRT}{2} \le t < \frac{PRT}{2}$$

[Formula 5]

$$f_R(t) = \cos 2\pi\left(\frac{k}{2}\left(t - \frac{R_T + R_R + 2V(t + N*PRT)}{C_{VT}}\right)^2 + F_C\left(t - \frac{R_T + R_R + 2V(t + N*PRT)}{C_{VT}}\right)\right) \quad (5)$$

The reception signal $f_R$ is amplified by the LNA 66, and subsequently, the frequency of the amplified reception signal $f_R$ is converted by the second FMCW signal (local signal) obtained by branching the transmission signal $f_T$. From the frequency-converted reception signal $f_R$, the low-frequency portion of the converted reception signal $f_R$ is extracted by the LPF 72. The intermediate frequency signal $f_{if}(t)$ obtained through these processes is represented by Eq. (6) below.

[Formula 6]

$$f_{if}(t) = \cos 2\pi\left(k\left(\frac{R_T + R_R + 2V(t + N*PRT)}{C}\right)t - F_C\left(\frac{R_T + R_R + 2V(t + N*PRT)}{C}\right)\right) \quad (6)$$

The intermediate frequency signal $f_{if}(t)$ is amplified by the intermediate frequency amplifying unit 74 and converted into a digital signal by the A/D 76. The frequency of the intermediate frequency signal $f_{if}(t)$ is converted through the fast Fourier transform by the preprocessing unit 78 to extract a signal component of each distance.

The position of the measurement object 16 or the non-measurement object is measured as the phase information for each repetition period PRT. To prevent this phase information from exceeding $2\pi$, a frequency PRF of repetition of the FMCW signal (hereinafter referred to as "repetition frequency PRF") is set to a frequency higher than a Doppler frequency Fd, for example. The repetition frequency PRF is represented by Eq. (7). The Doppler frequency Fd represents a velocity V of the measurement object 16 and depends on the velocity V of the measurement object 16 and a wavelength $\lambda$ of the transmission wave Tw.

$$PRF = 1/PRT > Fd = 2V/\lambda \quad (7)$$

When the repetition frequency PRF is higher than the Doppler frequency Fd, a time period t of the repetition period PRT is sufficiently small, so that the phase fluctuation due to the velocity can be ignored, and the intermediate frequency signal $f_{if}(t)$ is represented by Eq. (8) below.

[Formula 7]

$$f_{if}(t) = \cos 2\pi\left(K\left(\frac{R_T + R_R}{c}\right)t - F_c\left(\frac{R_T + R_R + 2V(N \cdot PRT)}{c}\right)\right) \quad (8)$$

The first term on the right side of Eq. (8) represents the frequency according to the position, and the second term represents the phase according to the velocity in each repetition period PRT. When the repetition frequency PRF is larger than $2V/\lambda$, the frequency change of the FMCW signal and the frequency change due to the Doppler frequency Fd are prevented from interfering with each other, and the measurement accuracy of the distance to the measurement object 16 and the velocity of the measurement object 16 is prevented from decreasing.

When the measurement object 16 moving at 300 kilometers per hour is measured by using an FMCW signal in the 24 GHz band generally used for velocity measurement, the wavelength $\lambda$ of the transmission wave Tw is 0.0125 meters, and the repetition frequency PRF is calculated by Eq. (9) below and is set to 13.3 kilohertz or higher, for example.

$$PRF > 2 \times 300/(3.6 \times 0.0125) = 13.3 \, [\text{kHz}] \quad (9)$$

A constant measurement accuracy $\Delta V$ is required for velocity measurement. The data acquisition period Tp described above is adjusted to meet the requirement of the measurement accuracy $\Delta V$. When the data acquisition period Tp is short, the accuracy of the frequency spectrum obtained by the fast Fourier transform is reduced, and the measurement accuracy $\Delta V$ is also reduced. On the other hand, when the data acquisition period Tp becomes longer, the movement amount of the measurement object 16 becomes large and the measurement accuracy $\Delta V$ is reduced.

The measurement accuracy $\Delta V$ is proportional to a required frequency accuracy $\Delta Fd$ of the Doppler frequency Fd and is represented by Eq. (10).

$$\Delta V = \Delta Fd \cdot \lambda/2 \quad (10)$$

A minimum period Tm of the data acquisition period Tp is represented by Eq. (11), for example, and the data acquisition period Tp is set to a value equal to or greater than Tm.

$$Tm = 1/\Delta Fd \quad (11)$$

For example, when the measurement accuracy $\Delta V$ is 1 kilometer per hour, the required frequency accuracy $\Delta Fd$ of the Doppler frequency Fd is represented by Eq. (12).

$$\Delta Fd = 2 \cdot \Delta V/\lambda = 44.45 \, [\text{Hz}] \quad (12)$$

From Eqs. (11) and (12), the data acquisition period Tp is set to a value represented by Eq. (13), i.e., a value of 22.5 milliseconds or more, for example.

$$Tp \ge Tm = 1/\Delta Fd = 1/44.45 = 0.0225 \, [\text{s}] \quad (13)$$

Therefore, the velocity measurement device 2-1 measures the velocity by using the FMCW signal having the repetition frequency PRF in a time of 22.5 milliseconds or more, for example, in the data acquisition period Tp of 22.5 milliseconds to 50 milliseconds described in the embodiment. When the data acquisition period Tp is set to a value between 22.5 milliseconds and 50 milliseconds, the velocity measurement can be performed 20 times or more per second.

Internationally, the bandwidth of the 24-GHz band radar frequency is 200 MHz, for example. A distance resolution $\Delta R$ of a radar using the FMCW signal having the bandwidth of 200 MHz is represented by Eq. (14).

$$\Delta R = c/(2 \cdot B) = 0.75 \, [\text{m}] \quad (14)$$

The distance resolution of 0.75 meters is sufficient for separating multiple vehicles and separately recognizing the vehicles. Therefore, the velocity measurement device 2-1 can measure the velocity of each vehicle by using the FMCW signal in the 24 GHz band.

For example, the repetition frequency PRF is set based on a maximum velocity V max measurable by the velocity measurement device 2-1. When the velocity of the measurement object 16 is V max, the Doppler frequency Fd max is represented by Eq. (15).

$$Fd\ max = 2 \cdot V\ max / \lambda \quad (15)$$

Therefore, the repetition frequency PRF is set to a value equal to or greater than Fd max. To measure the measurement object 16 moving at the maximum velocity V max, the image planes 22-1, 22-2, . . . 22-n described above are generated during the data acquisition period Tp by using the FMCW signal having a value of the repetition frequency PRF equal to or greater than Fd max. For example, when a vehicle running at 200 kilometers per hour is measured at 24 GHz, the Doppler frequency Fd max is represented by Eq. (16) from Eq. (15).

$$Fd\ max = 2 \times 200000/(3600 \times 0.0125) = 8889\ [Hz] \quad (16)$$

When the data acquisition period Tp is 22.5 milliseconds, the number N of the image planes 22 acquired during this data acquisition period Tp is represented by Eq. (17).

$$N = Tp \cdot Fd\ max = 200\ [planes] \quad (17)$$

To measure the velocity of the measurement object 16, the Doppler frequency may be measured from the phase data of the vehicle recorded in about 200 image planes 22.

In the FMCW signal system, an azimuth detection process of the measurement object 16 is performed for each distance to the measurement object 16. In this azimuth detection process, azimuth synthesis is performed from the reception signals $f_R$ of the receiving antennas 14-1, 14-2, . . . 14-n.

For example, the azimuth synthesis is performed as follows.

FIG. 11 shows an example of a reception state of a reception wave. In FIG. 11, the velocity measurement device 2-1 is assumed to use the single transmitting unit 36 and the six receiving units 38-1, 38-2, . . . 38-6.

The transmission signal $f_T$ is applied to the measurement object 16 at a distance $R_T$ from the transmitting antenna 12. The reflected wave Rw obtained from the measurement object 16 is received by the receiving antennas 14-1, 14-2, . . . 14-6. A total distance $R_n$ from the measurement object 16 to the transmitting antenna 12 and the receiving antennas 14-1, 14-2, . . . 14-6 is represented by Eq. (18).

$$R_n = R_T + R_{Rn} \quad (18)$$

The phases of the reception signals $f_R$ output by the receiving units 38-1, 38-2, . . . 38-6 differ from each other depending on the total distance $R_n$. In Eq. (18), n is the antenna number from 1 to 6 given to the receiving antennas 14-1, 14-2, . . . 14-6.

The reception signals $f_R$ output by these receiving units 38-1, 38-2, . . . 38-6 are subjected to a correlation process with a reference function by the signal processing unit 40. As a result, the signal processing unit 40 extracts a signal component in accordance with an azimuth resolution.

This azimuth resolution can be obtained as follows. When the receiving antennas 14-1, 14-2, . . . 14-6 are arranged in one line at equal distances d, spaces outside both ends of the antennas 14-1, 14-2, . . . 14-6 function as an antenna. The distance of the space functioning as an antenna is d/2, for example. In this case, an effective total aperture length D of the receiving antennas 14-1, 14-2, . . . 14-6 is represented by Eq. (19).

$$D = 5 \times d + d \quad (19)$$

In the receiving antennas 14-1, 14-2, . . . 14-6 having the total aperture length D as described above, when the wavelength of the transmission signal $f_T$ is $\lambda$, an expected azimuth resolution $\theta_{RES}$ is represented by Eq. (20) below.

$$\theta_{RES} = \lambda / D \quad (20)$$

When the transmitting antenna 12 and the receiving antennas 14-1, 14-2, . . . 14-6 all have the same aperture length, and the aperture length is $d_0$, a measurement range $\theta_0$ is represented by Eq. (21).

$$\theta_0 = d_0 / \lambda \quad (21)$$

A reference function $g(n, \theta)$ is generated for each azimuth resolution $\theta_{RES}$ for points on a circular sector line at the distance $R_0$ in the measurement range $\theta_0$ from a center position of the receiving antennas 14-1, 14-2, . . . 14-6. This reference function $g(n, \theta)$ is represented by Eq. (22):

[Formula 8]

$$g(R, n, \theta) = \exp\left(j\omega_c \frac{R_x(R, n, \theta)}{c}\right) \quad (22)$$

where $R_x(R, n, \theta)$ is the total distance $R_n$ from the transmitting antenna 12 to the nth receiving antenna 14-n via the measurement object 16 in an azimuth $\theta$ at a distance R from the velocity measurement device 2-1.

A signal $h(R, \theta)$ for each azimuth resolution is extracted by performing a correlation process of an intermediate frequency signal $f_{if}(R, n)$ and a conjugate function of a reference function $g(R, n, \theta)$. This signal $h(R, \theta)$ is represented by Eq. (23).

[Formula 9]

$$h(R, \theta) = \sum_n f_{if}(R, n) \cdot g^*(R, n, \theta) \quad (23)$$

The measurement of the azimuth and distance and the measurement of the velocity using the FMCW signal are performed as follows.

The arrival direction and the signal strength of the reflected wave Rw are specified by obtaining the phase plane of the reflected wave Rw. The distance of the measurement object 16 is calculated from the propagation delay time Td of the reflected wave Rw. The measurement data representing the velocity of the measurement object 16 can be generated by calculating and processing the phase fluctuation of the reflected wave Rw from the azimuth and distance where the measurement object 16 exists. For the generation of the measurement data representing the velocity of the measurement object 16, the process described in the embodiment can be employed. This process will not be described.

With the one-dimensionally arranged receiving antennas 14, the arrival direction of the reflected wave Rw from the measurement object 16 can be specified by a reference function multiplication process of the reception signal $f_R$. The transmitting unit 36 transmits the transmission signal $f_T$ toward the measurement object 16 and distributes the local signal synchronized with the transmission signal $f_T$ to the receiving units 38-1, 38-2, . . . 38-n at the same time. The reception signal $f_R$ of the mixer output is converted into a digital signal by the A/D 76 synchronized with a timing signal from the reference signal generating unit 52, is further converted by the FFT into the frequency domain representing the distance, and is input to the signal processing unit 40.

The signal processing unit 40 can specify the arrival directions of the reflected waves Rw by performing reference function multiplication for the output signals of all reception systems.

The azimuth resolution in a measurement image is determined by an inter-antenna distance between two of the receiving antennas 14 which are disposed most distant from each other. An observable viewing angle is determined by the antenna beam widths of the receiving antennas 14.

FIG. 12 is a flowchart showing an example of a process procedure of velocity measurement and image generation for a measurement object. This process procedure is an example of the velocity measurement method. In this process procedure, a process performed by the signal processing unit 40 is performed by executing an example of the velocity measurement program.

This process procedure includes position specification, velocity measurement, and image display for the measurement object 16 by the signal processing unit 40. In this process procedure, at the start of measurement, the signal processing unit 40 uses the transmitting unit 36 to transmit the transmission signal $f_T$ from the transmitting antenna 12 toward the measurement region 18 (S201). The transmission signal $f_T$ is also transmitted toward the measurement object 16 in the measurement region 18. The receiving units 38-1, 38-2, . . . 38-*n* receive the reflected waves Rw from the measurement object 16 and the non-measurement object in the measurement region 18 and generates the reception signal $f_R$ for each of the receiving antennas 14 (S202). The receiving-unit output signals described above are generated in synchronization with the transmission timing of the transmission signal $f_T$ from the reception signals $f_R$ obtained by the receiving units 38-1, 38-2, . . . 38-*n* (S203). The receiving-unit output signals are provided from the receiving units 38-1, 38-2, . . . 38-*n* to the signal processing unit 40.

The signal processing unit 40 calculates the phase plane of the reflected wave Rw with respect to the antenna plane of the receiving antennas 14 from the phase difference between the receiving-unit output signals and specifies the arrival direction and the signal strength of the reflected wave Rw (S204).

The signal processing unit 40 calculates the distance from the velocity measurement device 2-1 to the measurement object 16, from the propagation delay time Td of the reflected wave Rw, i.e., the time required from the transmission of the transmission signal $f_T$ to the reception of the reflected wave Rw (S205). The signal processing unit 40 may further calculate the distance from the velocity measurement device 2-1 to the non-measurement object, from the propagation delay time Td of the reflected wave Rw. At S205, the signal processing unit 40 transforms the receiving-unit output signals output by the receiving units 38-1, 38-2, . . . 38-*n* into the frequency domain through the fast Fourier transform. When the transmission wave Tw is the FMCW signal, the frequency obtained through the fast Fourier transform can directly be converted into the distance R to the measurement object 16 or the non-measurement object and is represented by Eq. (24):

$$R = f \cdot C/(2k) \quad (24)$$

where f is the output frequency of the fast Fourier transform, and k is the slope of the FMCW signal. By specifying the arrival direction at S204 and specifying the distance at S205, the position of the measurement object 16 or the non-measurement object reflecting the transmission signal $f_T$ is specified.

The signal processing unit 40 plots complex information of the reception signal $f_R$ from the measurement object 16 on the image planes 22-1, 22-2, . . . 22-*n* (FIG. 4) representing the position by the azimuth and the distance (S206). This complex information includes phase information of the measurement object 16 and is plotted for the specified azimuth and the specified distance on the image planes 22-1, 22-2, . . . 22-*n* at the repetition frequency PRF of the FMCW signal, for example.

The signal processing unit 40 calculates the phase fluctuation of the reflected wave Rw for each arrival direction and each distance (S207) and calculates the velocity of the measurement object 16 (S208). At S207 and S208, the signal processing unit 40 transforms the complex information corresponding to a constant time in the time direction of the image planes 22-1, 22-2, . . . 22-*n* through the Fourier transform to obtain the frequency spectrum described in the embodiment. The signal processing unit 40 calculates the velocity of the measurement object 16 from the frequency spectrum through the process described in the embodiment. The process of calculating the velocity from the frequency spectrum will not be described. The signal processing unit 40 may or may not calculate the velocity of the non-measurement object. Therefore, the signal processing unit 40 may determine that an object remaining still at the velocity of 0 is a non-measurement object and may omit the generation of measurement data representing the velocity of the non-measurement object.

The signal processing unit 40 generates the measurement data described above, transmits the measurement data to the image displaying unit 46, and causes the image displaying unit 46 to display the image 24 described in the embodiment, for example (S209). The signal processing unit 40 determines whether the process is terminated (S210) and, if the process is not terminated (NO at S210), the signal processing unit 40 returns to the transmission of the transmission signal $f_T$ (S201). Therefore, if the process is not terminated (NO at S210), the process from S201 to S210 is repeated. If the process is terminated (YES at S210), the signal processing unit 40 terminates this process.

According to Example 1, the following effects are obtained.

(1) The effects described in the embodiment can be obtained.

(2) Since the transmitting unit 36, the receiving unit group 38, and the signal processing unit 40 cooperate with each other by using the reference signal and the local signal, the measurement of the azimuth, distance, and velocity of the measurement object 16 is improved in accuracy.

Example 2

FIG. 13 shows an example of a velocity measurement device of a pulse signal system. In FIG. 13, the same portions as those of FIGS. 1, 7, and 9 are denoted by the same reference signs.

A velocity measurement device 2-2 includes the transmitting unit 36, the receiving units 38-1, 38-2, . . . 38-*n*, the signal processing unit 40, and the image displaying unit 46. The transmitting unit 36, the receiving units 38-1, 38-2, . . . 38-*n*, and the image displaying unit 46 are connected through a local area network, for example. The velocity measurement device 2-2 uses a pulse signal system.

The reference signal generating unit 52 included in the signal processing unit 40 generates a reference signal with high frequency stability and supplies the reference signal to the transmitting unit 36 and the receiving units 38-1, 38-2, . . . 38-n.

The transmitting unit 36 includes a chirp signal generating unit (CHIRP SGU) 80, a carrier signal generating unit (CARRIER SGU) 82, MIXERs 84-1, 84-2, a phase shifter 86, a power amplifying unit 88, and a distribution circuit 64.

With the reference signal provided from the reference signal generating unit 52, the chirp signal generating unit 80 generates a linear chirp signal, and the carrier signal generating unit 82 generates a carrier signal of a transmission frequency. The linear chirp signal is applied to the MIXERs 84-1, 84-2. The MIXER 84-1 mixes the linear chirp signal with the carrier signal. The MIXER 84-2 mixes the linear chirp signal with the carrier signal having a phase shifted by $\pi/2$ by the phase shifter 86. As a result, the chirp pulse signal serving as the transmission signal $f_T$ is converted into the transmission frequency by the carrier signal, and the transmission signal $f_T$ is obtained. The transmission signal $f_T$ is amplified to a predetermined level by the power amplifying unit 88, then supplied to the transmitting antenna 12, and applied toward the measurement region 18.

In this pulse signal system, the carrier signal generated by the carrier signal generating unit 82 is distributed by the distribution circuit 64 to the receiving units 38-1, 38-2, . . . 38-n. This carrier signal is used as the local signal in the receiving units 38-1, 38-2, . . . 38-n.

Each of the receiving units 38-1, 38-2, . . . 38-n includes the LNA 66, MIXERs 68-1, 68-2, a phase shifter 70, LPFs 72-1, 72-2, intermediate frequency amplifying units 74-1, 74-2, A/Ds 76-1, 76-2, and the preprocessing unit 78.

The reflected wave Rw from the measurement object 16 is received by the receiving antennas 14-1, 14-2, . . . 14-n, and the reception signal $f_R$ is obtained from each of the receiving antennas 14-1, 14-2, . . . 14-n. In each of the receiving units 38-1, 38-2, . . . 38-n, the reception signal $f_R$ is frequency-converted by the local signal to obtain an intermediate frequency signal. The intermediate frequency signal is amplified to a predetermined level and then converted into a digital signal by the A/Ds 76-1, 76-2.

The preprocessing unit 78 converts the provided reception signal $f_R$, which is the digital signal, through the FFT process into a digital signal having a frequency domain corresponding to a range space. This digital signal is provided to the signal processing unit 40 as a receiving-unit output signal.

The velocity measurement device 2-2 of the pulse signal system as described above can use a pulse compression technique as in general radars, and the range resolution can be improved by using the pulse compression technique.

FIG. 14 shows an example of a state of a transmission signal of a pulse signal system. A of FIG. 14 shows a frequency change of the transmission signal, and B of FIG. 14 shows an amplitude change of the transmission signal.

In this pulse signal system, when a chirp rate is k, the transmission signal $f_T(t)$ is represented by Eq. (25).

[Formula 10]

$$f_T(t) = \cos\pi\left(\frac{k}{2}t^2 + F_c t\right) \quad (25)$$

The reception signal $f_R$ is amplified by the LNA 66, the carrier signal is separated, and the frequency of the reception signal $f_R$ is converted by a local signal formed as a complex signal. From the converted reception signal $f_R$, the low-frequency portion of the converted reception signal $f_R$ is extracted by the LPFs 72-1, 72-2. The intermediate frequency signal $f_{if}$ is obtained through these processes.

The intermediate frequency signal $f_{if}$ is amplified by the intermediate frequency amplifying units 74-1, 74-2 and is converted into a digital signal by the A/Ds 76-1, 76-2 and is output to the processing unit 40 after the pulse compression of the chirp signal is performed by the preprocessing unit 78.

FIG. 15 shows an example of a pulse compression process of the preprocessing unit. A of FIG. 15 shows the pulse compression process, and B of FIG. 15 shows an output obtained by the pulse compression process.

This pulse compression process is performed by correlation between a chirp signal f(t) and a reference function g($\tau$). The reference function g($\tau$) is a conjugate function of a transmission chirp function in the chirp signal f(t) and is represented by Eqs. (26) and (27).

[Formula 11]

$$g(t) = \exp i2\pi\left(-\frac{k}{2}t^2\right) \quad (26)$$

[Formula 12]

$$y(t) = \int f_{if}(t+\tau)g(\tau)d\tau \quad (27)$$

The velocity measurement device 2-2 using the pulse signal system can specify the azimuth and distance of the measurement object 16, can plot the complex information of the reception signal $f_R$ from the measurement object 16 for the specified azimuth and the specified distance on the image planes 22-1, 22-2, . . . 22-n as in the velocity measurement device 2-1 using the FMCW signal, and can calculate the phase fluctuation of the reflected wave Rw for each arrival direction and each distance to generate measurement data representing the velocity of the measurement object 16.

According to Example 2, the same effects as Example 1 can be obtained.

Modification of Embodiment or Example (1) The measurement object 16 may be a moving object such as a railroad vehicle running on a railroad track, a ship travelling on a sea route, particularly a narrow sea route such as a strait, or an aircraft running on a runway.

(2) The velocity measurement devices 2, 2-1, 2-2 include the image displaying means 10 or the image displaying unit 46, and the image displaying means 10 or the image displaying unit 46 may be connected as a peripheral device to the velocity measurement devices 2, 2-1, 2-2 through wired or wireless connection. Therefore, the signal processing means 8 or the signal processing unit 40 may output the measurement data to a peripheral device such as the image displaying means 10 or the image displaying unit 46, and the peripheral device may display the image 24.

(3) The measurement data may be output to the memory unit 50 (FIG. 8) mounted on the velocity measurement devices 2, 2-1, 2-2, a speed limit enforcement system, the police having jurisdiction over the road 20 where the velocity measurement device 2 is disposed, etc. The memory unit 50 receiving the measurement data can continuously retain the measurement data. The velocity measurement devices 2, 2-1, 2-2 cooperating with the speed limit enforcement system or the police can shorten the time until an initial motion for speed limit enforcement. For example, the speed limit enforcement system receiving the measurement data timely determines whether the measurement object 16 is speeding based on the measurement data and photographs the measurement object 16 that is speeding and the driver thereof with a camera. Such a speed limit enforcement process enables timely detection of speeding.

(4) Although the signal strength is measured in the embodiments and examples described above, the measurement of the signal strength may be omitted. If the displacement and distance of the measurement object 16 are measured, the position of the measurement object 16 can be specified, and if the position of the measurement object 16 is specified, the velocity of the measurement object 16 can be measured.

As described above, the most preferable embodiments etc. of the present invention have been described; however, the present invention is not limited to the above description and can variously be modified and altered by those skilled in the art based on the spirit of the invention described in claims or disclosed in the description, and these modifications and alterations naturally fall within the scope of the present invention.

INDUSTRIAL APPLICABILITY

The embodiments and examples enable measurement of velocity of a measurement object such as a vehicle. The embodiments and examples can be utilized for measurement of velocity of a vehicle and speed limit enforcement, for example.

REFERENCE SIGNS LIST

2, 2-1, 2-2 velocity measurement device
4 transmitting means
6 receiving means
8 signal processing means
10 image displaying means
12 transmitting antenna
14 receiving antenna
16 measurement object
18 measurement region
20 road
22, 22-1, 22-2, . . . 22-n image plane
24 image
24-1 monitoring screen
24-2 signal strength index
24-3 velocity display field
36 transmitting unit
38 receiving unit group
40 signal processing unit
46 image displaying unit
48 processor
50 memory unit
52 reference signal generating unit
54 interface unit
56 output unit
58 signal generating unit
60 power amplifying unit
62 directional coupler
64 distribution circuit
66 low noise amplifier (LNA)
68, 68-1, 68-2 frequency mixer (MIXER)
70, 86 phase shifter
72, 72-1, 72-2 low pass filter (LPF)
74, 74-1, 74-2 intermediate frequency amplifying unit
76, 76-1, 76-2 analog/digital converter (A/D)
78 preprocessing unit
80 chirp signal generating unit
82 carrier signal generating unit
84-1, 84-2 MIXER
88 power amplifying unit

The invention claimed is:

1. A velocity measurement device, comprising:
a transmitting means that transmits a transmission signal by a transmitting antenna toward a measurement object;
a receiving means that receives a reflected wave from the measurement object with a plurality of receiving antennas and generates a reception signal for each of the receiving antennas; and
a signal processing means that obtains a phase plane of the reflected wave with respect to an antenna plane of the plurality of receiving antennas from a phase difference between the reception signals to specify an arrival direction of the reflected wave, obtains a distance to the measurement object from a propagation delay time of the reflected wave, and calculates a phase fluctuation of the reflected wave to calculate a velocity of the measurement object from the phase fluctuation, wherein
the velocity measurement device measures a velocity of a vehicle running on a road as the velocity of the measurement object.

2. The velocity measurement device according to claim 1, further comprising a display means that displays an image representing the position and the velocity of the measurement object in accordance with the arrival direction of the reflected wave, the distance to the measurement object, and the velocity of the measurement object.

3. The velocity measurement device according to claim 1, further comprising a signal generating means that generates a reference signal for synchronizing the transmission signal of the transmitting means, the reception signal of the receiving means, and a signal process of the signal processing means.

4. The velocity measurement device according to claim 1, wherein
the transmitting means outputs a pulse signal, or a pulse signal chirp-modulated for pulse compression, for detecting the measurement object or a distance to the measurement object, and wherein
the receiving means performs the pulse compression of the reception signal in phase synchronization with a reference signal and separates the measurement object by the distance.

5. The velocity measurement device according to claim 1, wherein
the transmitting means outputs an FMCW signal for detecting the measurement object or a distance to the measurement object, wherein
the transmitting means branches a portion of the transmission signal to generate a local signal, and wherein
the receiving means generates an intermediate frequency signal by using the local signal, analyzes the intermediate frequency signal in phase synchronization with a reference signal, and separates each measurement object by the distance.

6. The velocity measurement device according to claim 1, wherein
the plurality of receiving antennas is arranged one-dimensionally, and wherein the receiving means or the signal processing means specifies an azimuth of the measurement object from a phase difference of the reception signal.

7. A velocity measurement program stored on a non-transitory computer readable medium for causing a computer to measure a velocity of a measurement object, the velocity measurement program causing the computer to execute processes of:
   transmitting a transmission signal by a transmitting antenna toward a measurement object; and
   obtaining, from a phase difference between reception signals generated from a reflected wave from the measurement object received with a plurality of receiving antennas, a phase plane of the reflected wave with respect to an antenna plane of the plurality of receiving antennas to specify an arrival direction of the reflected wave, obtaining a distance to the measurement object from a propagation delay time of the reflected wave, calculating a phase fluctuation of the reflected wave to calculate a velocity of the measurement object from the phase fluctuation, and measuring a velocity of a vehicle running on a road as the velocity of the measurement object.

8. The velocity measurement program according to claim 7, further causing the computer to execute a process of displaying an image representing the position and the velocity of the measurement object in accordance with the arrival direction of the reflected wave, the distance to the measurement object, and the velocity of the measurement object.

9. A non-transitory computer-readable recording medium recording a velocity measurement program for causing a computer to measure a velocity of a measurement object, the velocity measurement program causing the computer to execute the processes of:
   transmitting a transmission signal by a transmitting antenna toward a measurement object; and
   obtaining, from a phase difference between reception signals generated from a reflected wave from the measurement object received with a plurality of receiving antennas, a phase plane of the reflected wave with respect to an antenna plane of the plurality of receiving antennas to specify an arrival direction of the reflected wave, obtaining a distance to the measurement object from a propagation delay time of the reflected wave, calculating a phase fluctuation of the reflected wave to calculate a velocity of the measurement object from the phase fluctuation, and measuring a velocity of a vehicle running on a road as the velocity of the measurement object.

10. The computer-readable recording medium according to claim 9, recording the velocity measurement program further causing the computer to execute a process of displaying an image representing the position and the velocity of the measurement object in accordance with the arrival direction of the reflected wave, the distance to the measurement object, and the velocity of the measurement object.

11. A velocity measurement method comprising:
   transmitting a transmission signal by a transmitting antenna toward a measurement object;
   receiving a reflected wave from the measurement object with a plurality of receiving antennas and generating a reception signal for each of the receiving antennas; and
   obtaining a phase plane of the reflected wave with respect to an antenna plane of the plurality of receiving antennas from a phase difference between the reception signals to specify an arrival direction of the reflected wave, obtaining a distance to the measurement object from a propagation delay time of the reflected wave, calculating a phase fluctuation of the reflected wave to calculate a velocity of the measurement object from the phase fluctuation, and measuring a velocity of a vehicle running on a road as the velocity of the measurement object.

12. The velocity measurement method according to claim 11, further comprising
   displaying an image representing the position and the velocity of the measurement object in accordance with the arrival direction of the reflected wave, the distance to the measurement object, and the velocity of the measurement object.

* * * * *

UNITED STATES PATENT AND TRADEMARK OFFICE
CERTIFICATE OF CORRECTION

| | | |
|---|---|---|
| PATENT NO. | : 11,914,021 B2 | Page 1 of 1 |
| APPLICATION NO. | : 16/979322 | |
| DATED | : February 27, 2024 | |
| INVENTOR(S) | : Hitoshi Nohmi | |

It is certified that error appears in the above-identified patent and that said Letters Patent is hereby corrected as shown below:

In the Specification

Change
Column 15, Line 12 - 17:

[Formula 5]

$$f_R(t) = \cos 2\pi \left\{ \frac{k}{2}\left(t - \frac{R_T + R_R + 2V(t + N \cdot PRT)}{C_{vt}}\right)^2 + F_C\left(t - \frac{R_T + R_R + 2V(t + N \cdot PRT)}{C_{vt}}\right)\right\} \quad \cdots (5)$$

To Be:

[Formula 5]

$$f_R(t) = \cos 2\pi(\frac{k}{2}(t - \frac{R_T + R_R + 2V(t+N*PRT)}{C_{vt}})^2 + F_C(t - \frac{R_T + R_R + 2V(t+N*PRT)}{C})) \quad \cdots (5)$$

Signed and Sealed this
Thirtieth Day of April, 2024

*Katherine Kelly Vidal*

Katherine Kelly Vidal
*Director of the United States Patent and Trademark Office*